United States Patent
EL-Qawasmeh et al.

(10) Patent No.: US 12,554,243 B2
(45) Date of Patent: Feb. 17, 2026

(54) MODEL FOR A MANUFACTURING PROCESS

(71) Applicant: Rivian IP Holdings, LLC, Plymouth, MI (US)

(72) Inventors: Omar EL-Qawasmeh, Bloomington, IL (US); Fasil Mulatu Kero, Marietta, GA (US)

(73) Assignee: Rivian IP Holdings, LLC, Irvine, CA (US)

( * ) Notice: Subject to any disclaimer, the term of this patent is extended or adjusted under 35 U.S.C. 154(b) by 516 days.

(21) Appl. No.: 18/064,377

(22) Filed: Dec. 12, 2022

(65) Prior Publication Data

US 2024/0192657 A1    Jun. 13, 2024

(51) Int. Cl.
*G05B 19/4097*    (2006.01)

(52) U.S. Cl.
CPC ............... *G05B 19/4097* (2013.01); *G05B 2219/32359* (2013.01)

(58) Field of Classification Search
CPC ...... G05B 19/4097; G05B 2219/32359; G05B 19/41805
See application file for complete search history.

(56) References Cited

U.S. PATENT DOCUMENTS

| | | | | |
|---|---|---|---|---|
| 2008/0121168 A1* | 5/2008 | Ryznar | ............ | G05B 19/41805 116/202 |
| 2015/0293525 A1* | 10/2015 | Yamamoto | ......... | G05B 19/4097 702/182 |
| 2016/0116911 A1* | 4/2016 | Yamamoto | .......... | G06F 16/9024 700/98 |
| 2017/0066092 A1* | 3/2017 | Yamamoto | ............. | G06F 30/17 |
| 2019/0217455 A1* | 7/2019 | Kobayashi | .......... | B25B 23/1425 |
| 2021/0311464 A1* | 10/2021 | Kajita | ............. | G05B 19/41805 |

OTHER PUBLICATIONS

Battini, Daria, et al. "Preventing ergonomic risks with integrated planning on assembly line balancing and parts feeding." International Journal of Production Research 55.24 (2017): 7452-7472. (Year: 2017).*

Neumann, Daniel, and Jan Keidel. "A problem design and constraint modelling approach for collaborative assembly line planning." Robotics and Computer-Integrated Manufacturing 55 (2019): 199-207. (Year: 2019).*

(Continued)

*Primary Examiner* — Christopher E. Everett
(74) *Attorney, Agent, or Firm* — Foley & Lardner LLP

(57) ABSTRACT

The present solution provides a model for manufacturing products, such as electric vehicles. The solution can use a data processing system to receive data identifying physical characteristics of a part of a plurality of parts of a product to assemble. Data processing system can identify a first constraint corresponding to ergonomic data for assembling the part. Data processing system can identify a second constraint corresponding to the physical characteristics of the part. Data processing system can generate, using the data input into a model of the data processing system and based on the first constraint and the second constraint, a sequence identifying an order in which to assemble the part into the product with respect to assembly of the plurality of parts.

18 Claims, 19 Drawing Sheets

(56) References Cited

OTHER PUBLICATIONS

Yakup Kara, Yakup Atasagun, Hadi Gökçen, Seda Hezer & Neslihan Demirel (2014) An integrated model to incorporate ergonomics and resource restrictions into assembly line balancing, International Journal of Computer Integrated Manufacturing, 27:11, 997-1007 (Year: 2014).*

Cimen, Tolga, Adil Baykasolu, and S. Akyol. "Assembly line rebalancing and worker assignment considering ergonomic risks in an automotive parts manufacturing plant." International Journal of Industrial Engineering Computations 13.3 (2022): 363-384. (Year: 2022).*

* cited by examiner

MODEL FOR A MANUFACTURING PROCESS

INTRODUCTION

Electric vehicles (EVs) can be assembled using many different parts. The manufacturing process can be implemented in a manufacturing facility in accordance with designs, plans, and schedules.

SUMMARY

The present solutions are generally directed to a solution for providing one or more models of a manufacturing or an assembly process, which can include models based on machine learning (ML) and artificial intelligence (AI). The process modeled can be any manufacturing process, such as the process of assembly of an electric vehicle in an electric vehicle manufacturing facility. The present solution can provide a virtual assistant to allow users, such as manufacturing engineers and technicians, to access or utilize a model of the manufacturing process via a computer interface and receive information on various details of the modeled manufacturing process. A graphical user interface can allow users to communicate to the virtual assistant (e.g., a virtual human on a computer) who can provide the users with various details of the modeled process, such as plans or data on specific manufacturing process steps, parts to be used in the assembly of a product, sequence in which the parts are to be installed into the product, manufacturing facility layout or plans, listing of tools for each station in the manufacturing facility, details on each fabrication stations or cycle time for completing each part of the process. The present solution can use the models to describe, simulate or predict the manufacturing process performance in view of various variations in inputs or constraints, such as for example assembly of an electric vehicle in accordance with ergonomic constraints for the assemblers and physical constraints of the parts being assembled, constraints related to the manufacturing facility's organization and structure or manufacturing station organization and their availability. Users may be able to join and interact with the virtual assistant using third party tools, such as video conference applications (e.g., Zoom, WebEx or Microsoft Teams) and have discussions with the virtual human in the virtual assistant tool, including by typing or speaking with the virtual assistant through a video conference call.

At least one aspect is directed to a system. The system can include a data processing system. The data processing system can receive data to identify dimensions of a part of a plurality of parts of a product to assemble. Data processing system can identify a first constraint corresponding to ergonomic data for assembling the part. Data processing system can identify a second constraint corresponding to dimensions of the part. Data processing system can generate, using the data input into a model of the data processing system and based on the first constraint and the second constraint, a sequence to identify an order in which the part is assembled into the product with respect to assembly of the plurality of parts.

At least one aspect is directed to a method. The method can include receiving, by a data processing system, data to identify dimensions of a part of a plurality of parts of a product to assemble. The method can include identifying, by the data processing system, a first constraint corresponding to ergonomic data for assembling the part. The method can include identifying, by the data processing system, a second constraint corresponding to dimensions of the part. The method can include generating, using the data input into a model of the data processing system and based on the first constraint and the second constraint, a sequence to identify an order in which to assemble the part into the product with respect to assembly of the plurality of parts.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
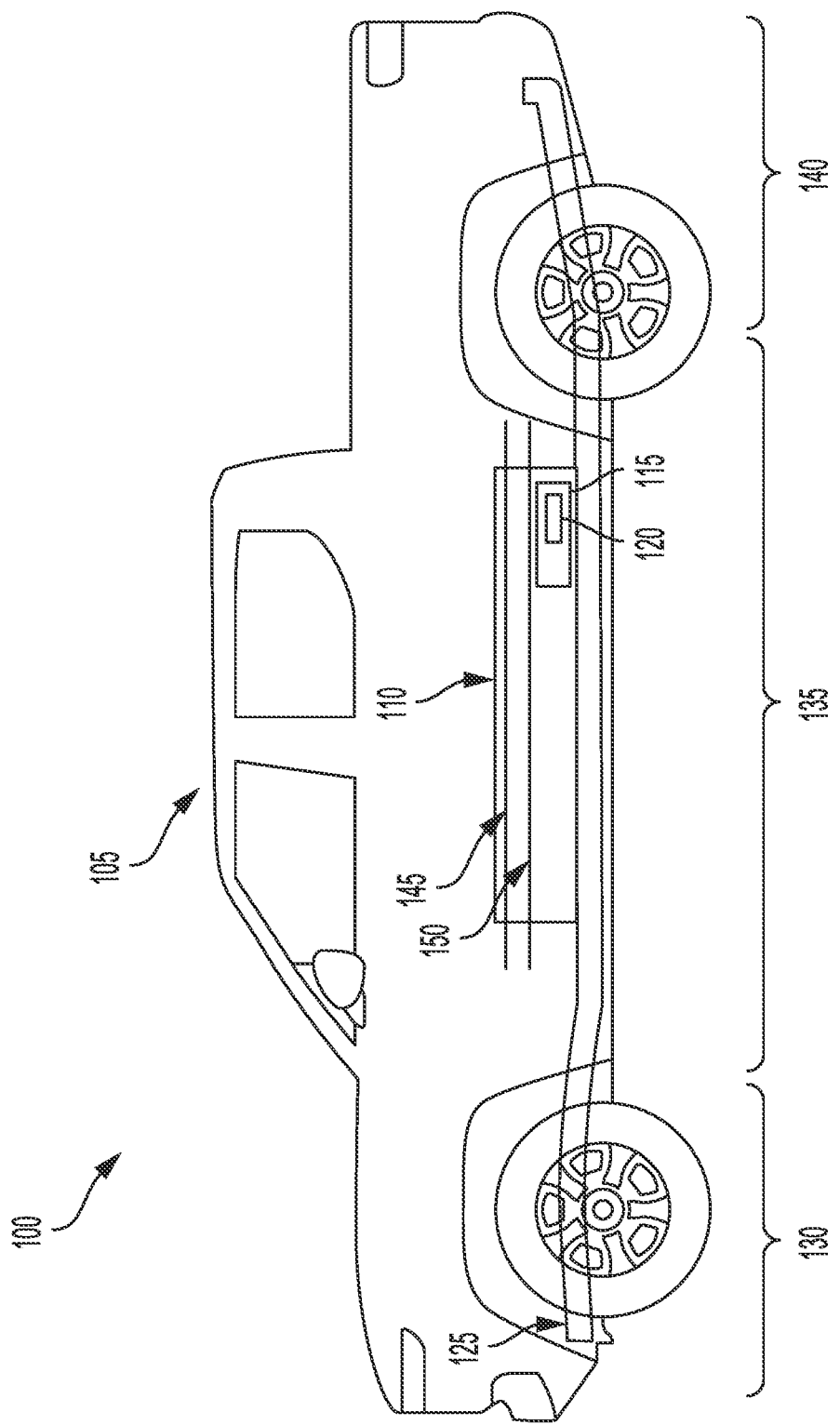
FIG. 1 depicts an example electric vehicle.

Following below are more detailed descriptions of various concepts related to, and implementations of, methods, apparatuses, and systems of controlling the vehicle tire slip using predictive control modeling. The various concepts introduced above and discussed in greater detail below may be implemented in any of numerous ways.

The present solution is generally directed to a machine learning and/or artificial intelligence model for modeling effective and efficient manufacturing, fabrication or assembly of one or more products, such as electric vehicles. For example, the present solution can provide solution models for maximizing the number of products that can be produced a time constraint, improve a manufacturing or an assembly process in a fabrication facility, utilize manufacturing space most efficiently, provide production within ergonomic constraints to protect the health of the workers, and determine an estimate of production cycle time based on particular arrangement of fabrication space, usage of tools or arrangement of assembly process.

The present solution can utilize product component data, such as drawings, data on component locations within a fabricated system and dimensions on all the parts used for fabricating a product, as well as assembly drawings for various systems and subsystems of a product (e.g., a system or a product, such as an electric vehicle). The present solution can utilize the product data, along with ergonomics data associated with data on parts and on assemblers, to generate a sequence of assembling actions identifying an order in which parts of a product are to be assembled most quickly and safely (e.g., in accordance with the ergonomics data). The present solution can utilize one or more model functions to provide manufacturing plans for the facility, including select stations for the fabrication process based on ergonomics for each assembled part, identify tools to use at each fabrication station, determine time cycles or time durations for installation of each part and determine the order in which to assemble each of the parts and with which tools and at what stations in order to minimize the manufacturing time within the mechanical and ergonomic constraints.

To assist users with utilizing the model solutions, a virtual assistant can be provided having software functions executing on a server, server farm or cloud at all times so as to be available and ready for use (e.g., to save time) at the request of the user. A user, such as a manufacturing engineer or a technician, may ask any question related to the fabrication, manufacturing or assembly process. For example, a user can ask "show me the floor plan of the product fabrication plant," or "show me a map of the fabrication facility," or "show me the final assembly lines." In response to such requests, the system can utilize the present solution to provide for the user various output, such as images, videos or 3D drawings of the floor plan, map or assembly lines of the fabrication facility. In one example, a manufacturing or a process engineer may ask the virtual assistant create an assembly sequence for new vehicle. In response to this request, the virtual assistant can provide the user with the assembly sequence of each of the parts of the particular requested vehicle, or any other product being manufactured at the facility.

The present solution can include an AI/ML model that can analyze the parts or component data on a manufactured product (e.g., a new vehicle being assembled) and decide which parts of the product should be assembled and in which order. In doing so, the model can determine the sequence identifying the order of parts to be assembled one after another on the assembly line. For example, the present solution can determine the cycle time for installation of each individual part of a vehicle. If it is determined that the part assembly is over cycle (e.g., taking longer than expected), the part can be moved to a different assembly line or a different station where such part can be installed more quickly or efficiently. By rearranging the order of installations, types of assembly stations used, or other aspects of the manufacturing process, the present solution can ensure that all parts can be assembled within the cycle time and as quickly as possible.

The present solution can evaluate the ergonomics for installing each part to ensure that the parts are assembled within the correct ergonomic zone for each part. For instance, the present solution can model the height of the part during the installation by an installer and if a part is too high for an assembler to safely or comfortably handle (e.g., based on the ergonomic data) the modeled solution can determine that a station with a platform should be used for installing this particular part. The present solution can provide a notification to that effect or schedule installation of that particular part at an assembly station that has a sufficiently high platform to make the installation more comfortable and efficient.

For example, the present solution can allow users, such as manufacturing engineers, to ask virtual assistant to make the model move parts for the product to be assembled virtually around the model of the plant. The present solution can model if the physical movement of the parts is efficient or possible, including based on the cycle time, ergonomic analysis or any other constraints (e.g., previously scheduled commitments for particular assembly stations, particular tool installation or operation requirements and more).

For example, the present solution can allow users to ask, via the virtual assistant, assembly instructions based on the generated assembly sequence. The present solution can utilize the model to generate the assembly instructions based on the modeled sequence of part installations. The present solution can also generate the listing of stations in which the parts are to be assembled, listing of tools to be used for each part assembly in each station, description of number of assemblers needed at each station, cycle time for each one or more assembly steps or tasks at each of the stations, and more.

FIG. 1 depicts an example cross-sectional view 100 of an electric vehicle 105 installed with at least one battery pack 110. Electric vehicles 105, also referred to as EV 105, can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. EVs 105 can include gasoline or diesel engine vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
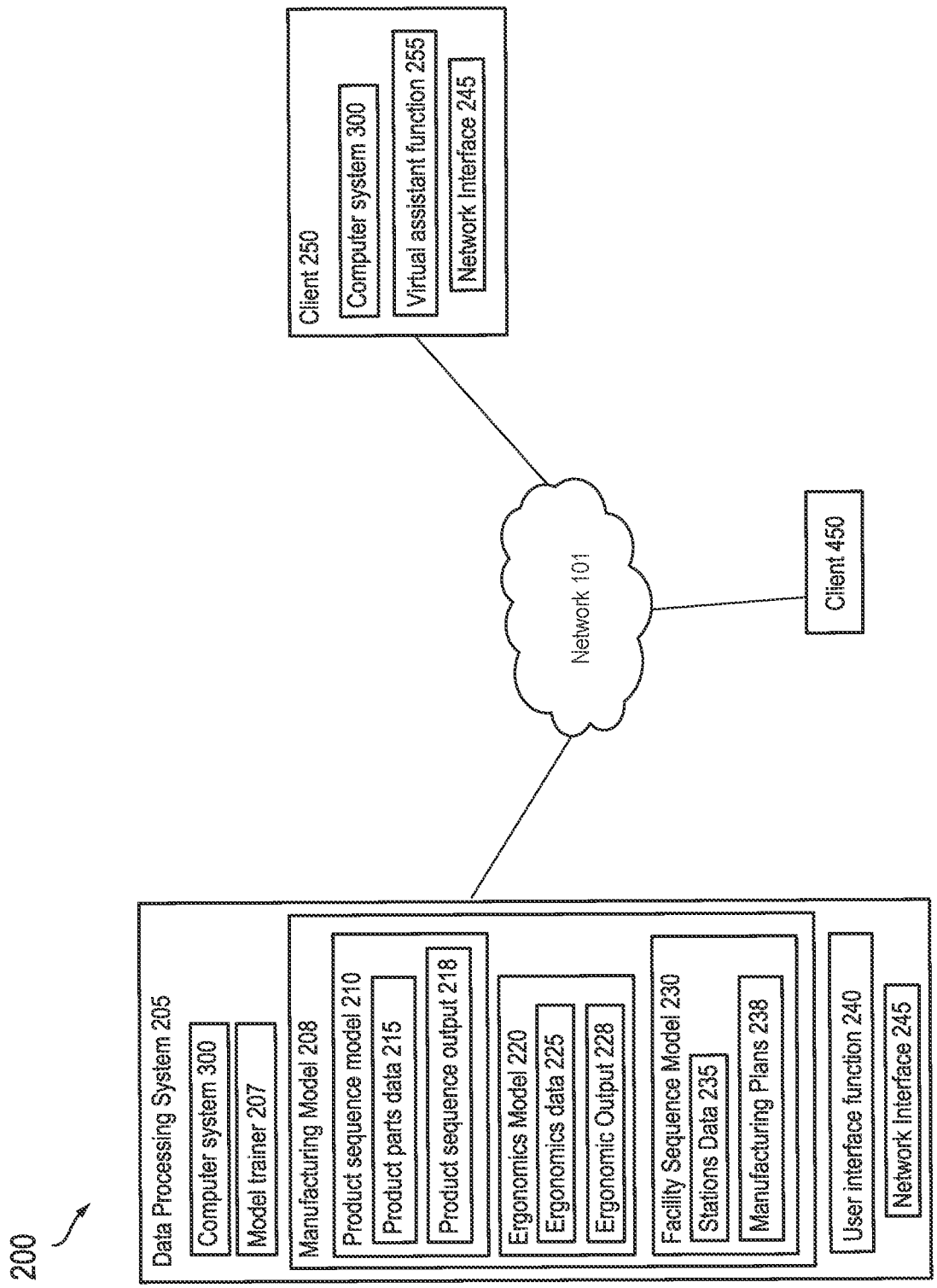
FIG. 2 is a block diagram of an example of a system for implementing a model for a manufacturing and assembly process.

FIG. 2 depicts a block diagram of a system 200 for implementing one or more manufacturing models for modeling, determining, estimating or predicting assembly, fabrication or manufacturing of any one or more products at a facility or a plant. System 200 can include a data processing system (DPS) 205 that can communicate over a network 101 with one or more clients 250. Data processing system 205 can include one or more computer systems 300, one or more model trainers 207, one or more manufacturing models 208, one or more virtual assistant functions 255 and one or more network interfaces 245. Each manufacturing model 208 can include one or more product sequence models 210, ergonomic models 220 and facility sequence models 230 for modeling the manufacturing process of a product. A product sequence model 210 can include or use product parts data 215 and provide outputs such as product sequence output 218. An ergonomics model 220 can include or use ergonomics data 225 and provide ergonomic output 228. A facility sequence model 230 can include or use stations data 235 and provide manufacturing plans 238. Across the network 101, each client 250 can include a computer system 300, a network interface 245 and a virtual assistant function 255 to allow users to communicate with the DPS 205 and utilize the model 208, including its models 210, 220 and 230, via the user interface function 240 and the network interface 245.

The system 200 can utilize the DPS 205 that can execute or be implemented using a computer system 300. DPS can include and use model trainer 207 to train manufacturing model 208 or any of its internal AI or ML functions or models to provide modeling, determination, estimation or prediction of performance, operation or activity corresponding to a manufacturing or assembly of a product, such as an electric vehicle. Product sequence model 210 can utilize various product parts data 215 as inputs to provide a product sequence output 218, which can include a sequence or order of products to install during the product manufacturing or assembly. Ergonomics model 220 can use ergonomics data 225 as input to provide ergonomic output 228, such as ergonomic zones within which assemblers should operate during the installation of the product. Facility sequence model 230 can include stations data 235 as input to produce manufacturing plans 238 as output. User interface function 240 can allow clients 250 to access manufacturing model 208 and its data using user interface functions 245 on client 250 machines over the network 101.

Data processing system (DPS) 205 can include any combination of hardware and software for implementing a manufacturing model 208. DPS 205 can include a processor, a controller, a microcontroller or a control circuit and can operate, execute, or be implemented by a computer system 300. DPS 205 can include functions, computer code, scripts or instructions stored in memory, such as memory 315 or storage 325, and can be executed on one or more processors, such as processor 310. DPS 205 can include any functionality for training and implementing a model for manufacturing, fabrication or assembly of a product, such as an electric vehicle, or any other products, such as various machines, systems and so on. DPS 205 can use data corresponding to products being assembled or manufacturing facility in which the assembly or fabrication is taking place to model the manufacturing process of the products. DSP 205 can generate or output product sequence output 218, ergonomic output 228 or manufacturing plans 238.

Model trainer 207 can include any combination of hardware and software, such as scripts, functions and computer code stored in memory or operating on a processor for training manufacturing model 208 or any of its internal functions (e.g., models). Model trainer 207 can include the functionality to generate or train the manufacturing model 208, product sequence model 210, ergonomics model 220 and facility sequence model 230. Model trainer 207 can perform the training using an artificial intelligence ("AI") or machine learning ("ML") functions or techniques. For example, model trainer 207 can include any combination of supervised learning, unsupervised learning, or reinforcement learning. Model trainer 207 can include the functionality including or corresponding to linear regression, logistic regression, a decision tree, support vector machine, Naïve Bayes, k-nearest neighbor, k-means, random forest, dimensionality reduction function, or gradient boosting functions.

Manufacturing model 208 can include any combination of hardware and software for determining or predicting performance of a manufacturing, fabrication or assembly process for producing a product. Manufacturing model 208 can include models or functions for modeling a particular aspect or a part of a manufacturing, fabrication or assembly process. Manufacturing model 208 can include a product sequence model 210, ergonomics model 220 and facility sequence model 230.

Manufacturing model 208 can include or utilize one or more input or output functions to drive input or output data between different models or functions. For example, manufacturing model 208 can include input functions for entering data into models 210, 220 or 230. For example, manufacturing model 208 can include output functions for processing data from output models 210, 220 or 230. Output functions can include the functionality, such as logic or combination of instructions and hardware, for organizing output data from models 210, 220 or 230 and generating user requested outputs, such as for example, lists of tools for a station for a particular assembly process, a manufacturing plan for a facility, a traveler document or any other output that a user of the model can ask for.

Product sequence model 210 can determine or predict order or sequence of parts to be installed into the product based on the their geometries, sizes, dimensions or cycle time for installing each part in view of other parts. Product sequence model 210 can utilize product parts data, such as part or system drawings, schematics, along with dimensions, geometries or other specifications to determine the product sequence output 218 that can provide the most efficient order in which parts are to be assembled into the product.

Ergonomics model 220 can determine or predict ergonomic output 228, such as positions, areas or regions within which assemblers can operate to perform the manufacturing tasks. Ergonomics model 220 can use ergonomics data 225, such as data on areas or volumes with respect to assemblers within which parts can be safely, efficiently or conveniently installed into the product to determine ergonomic output 228 identifying the heights, widths, depths or other positions or distances with respect to an assembler assembling the product.

Facility sequence model 230 can utilize station data 235 to determine manufacturing plans 238. Station data 235 can include ergonomic output 228 and product sequence output 218 as well as data on facility/plant layout, stations, station settings and tools available on each station. Manufacturing plans 238 can include assembly lines organizations, assembly instructions, bill of process, listing of tools to use, cycle time for assembly or manufacture and so on.

Manufacturing model 208, as well as models 210, 220 and 230, can each include machine learning scripts, code or sets of instructions or any other AI or ML related functionality described herein. Manufacturing model 208 can include one or more Similarity and Pareto search functions, Bayesian optimization functions, neural network-based functions or any other optimization functions or approaches. Models 208, 210, 220 and 230 can each include an artificial neural network (ANN) function or a model, including any mathematical model composed of several interconnected processing neurons as units. The neurons and their connections can be trained with data, such as any input data discussed herein. The neurons and their connections can represent the relations between inputs and outputs. Inputs and outputs can be represented with or without the knowledge of the exact information of the system model. For example, models 208, 210, 220 and 230 can be trained by model trainer 207 using neuron by neuron (NBN) algorithm.

User interface function 240 can include any function for using model 208 or providing outputs from model 208 to clients 250. User interface function 240 can include a virtual assistant agent communicating with virtual assistant function 255 on a client 250 over a network 101. User interface function 240 can enable a virtual assistant function 255 to communicate requests and receive outputs from model 208. For example, a virtual assistant function 255 operated by a user, such as a manufacturing engineer, can request from the user interface function 240 any one or more of: a sequence of parts to assemble a product, manufacturing plans, listing of tools, instructions to assemble a product, listing of stations to use for the assembly, listing of products to install or assemble at any particular station of the facility/plant, listing of tools for any particular station, and so on. Upon receiving the requested information, the user interface function 240 can provide the requested information from the model 208 to the virtual assistant function 255 on the client 250 over a network 101. Virtual assistant function 255 can provide the data to the user at the client 250.

Depending on the implementation, the virtual assistant function 255 can include or operate with a video conference software and can include the functionality for the users to access or use the manufacturing model 208 by speaking, typing or otherwise communicating with the user interface function 240 that utilizes the manufacturing model 208.

Network interface 245 can include any combination of hardware and software for communicating via a network 101. Network interface 245 can include scripts, functions and computer code stored in memory and executed or operating on one or more processors to implement any network interfacing, such as network communication via a network 101. Network 101 can include any wired or wireless network, a communication cable or a cable for transmitting information or data, a World Wide Web, a local area network, a wide area network, a Wi-Fi network, a Bluetooth network or any other communication network or platform. Network interface 245 can include functionality for communicating, via network 101, using any network communication protocol such as Transmission Control Protocol (TCP)/Internet Protocol (IP), user datagram protocol (UDP), or any other communication protocol used for communicating over a network 101. Network interface 245 can include communication ports and hardware for receiving and sending data and messages over the network 101 or via a power cable. Network interface 245 can include the functionality to encode and decode, send and receive any information, such as communication between User interface function 240 and user interface function 245.

Figure 3:
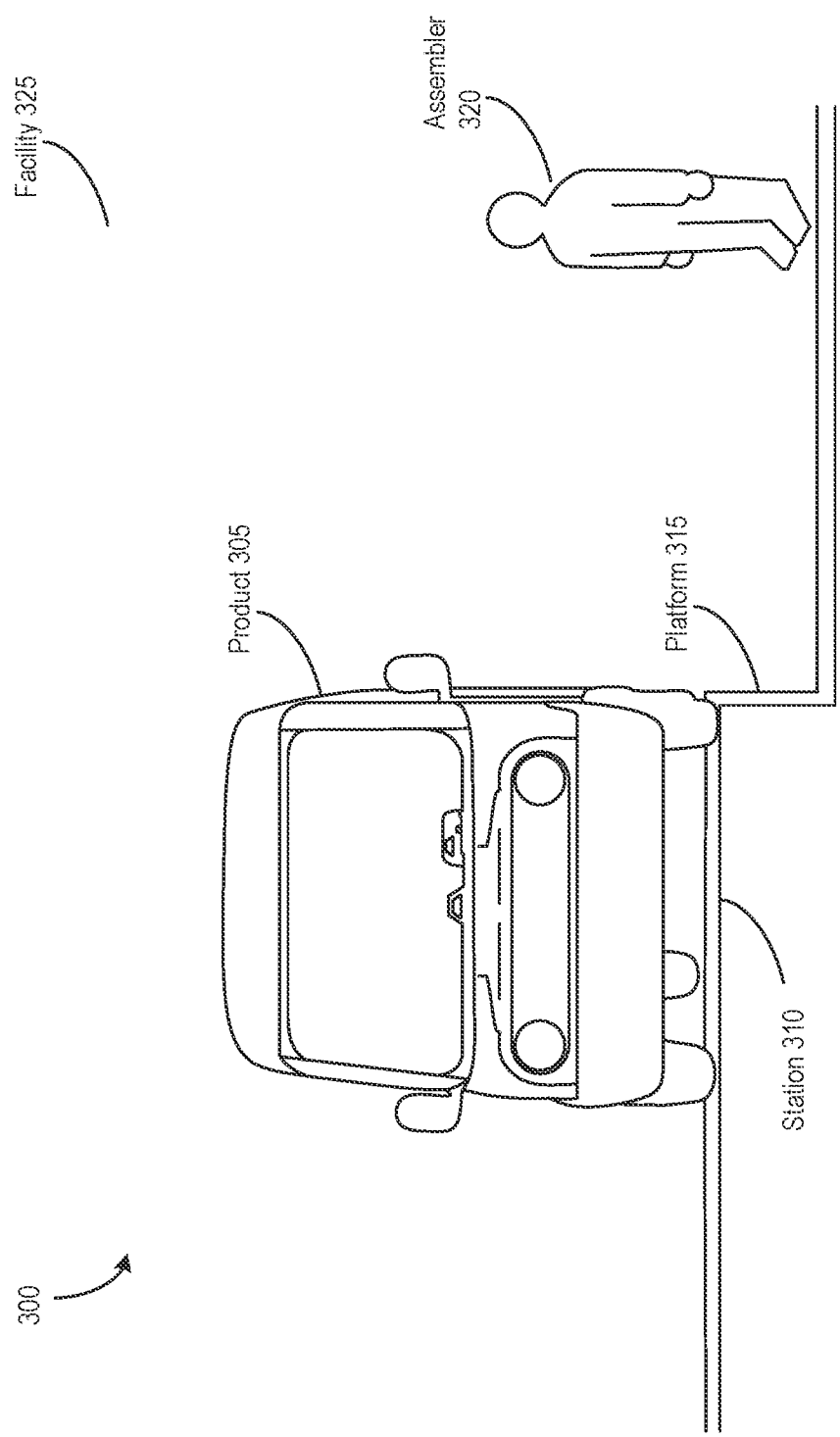
FIG. 3 depicts a diagram of a manufacturing model output of an assembly at a station in a manufacturing facility.

FIG. 3 illustrates an example manufacturing task 300 performed on a product 305 by a technician or an assembler 320 that can be modeled using the system 200. For example, manufacturing model 208 can relate to a product 305 that can be manufactured or assembled in a fabrication station 310 inside of a manufacturing facility 325. The station 310 can include an elevated platform 315 that can be used to satisfy ergonomic constraints with respect to installation of particular parts of the product 305 during the assembly. The system 200 can utilize the manufacturing model 208 to evaluate a variety of sequences of parts installations to identify the most efficient sequence and its corresponding arraignment of fabrication stations 310 with any number of different platforms 315 to assist assemblers 320 in assembling the product 305 within the facility 325 most efficiently.

Figure 4:
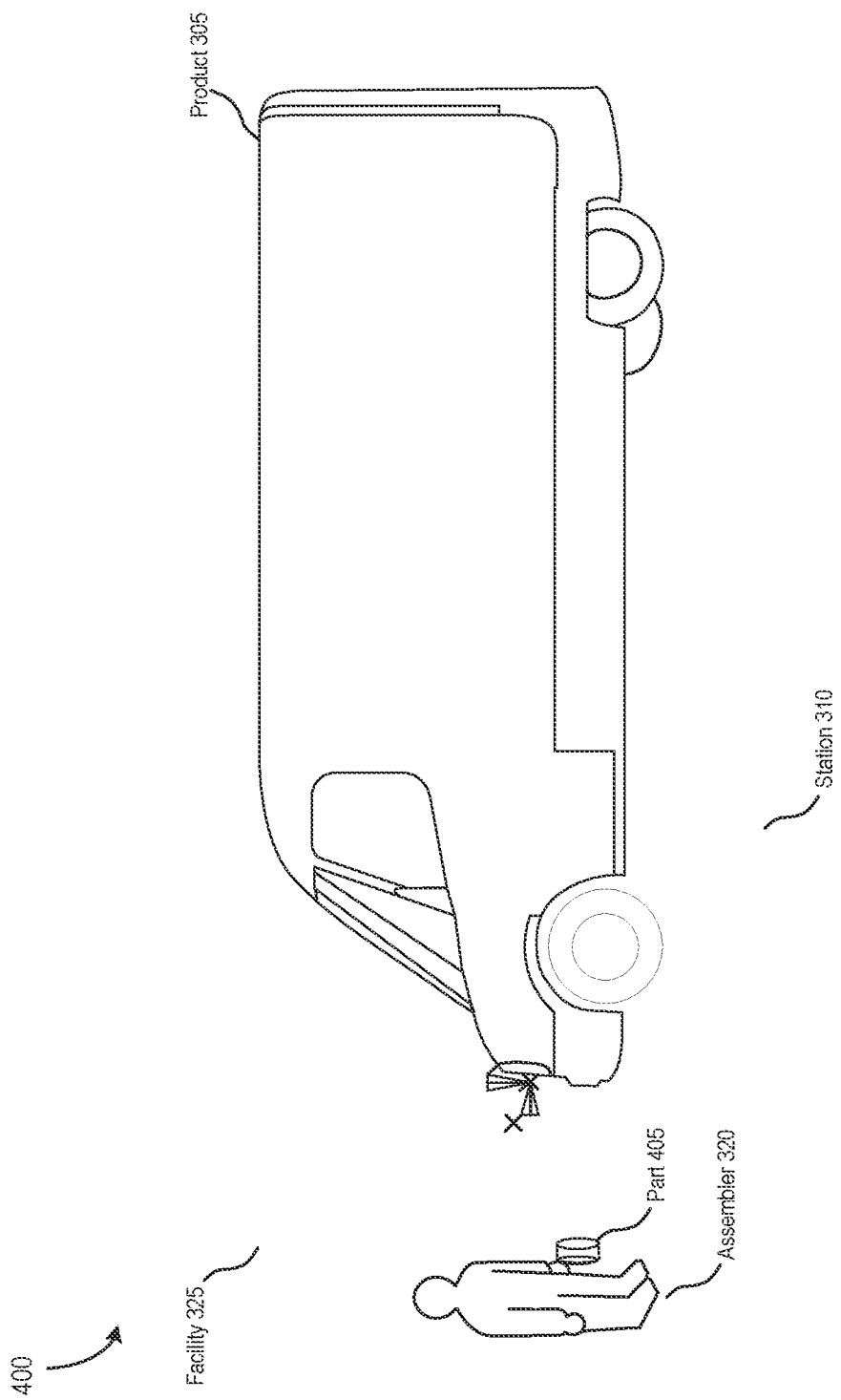
FIG. 4 depicts a diagram of a manufacturing model output of an assembly at another station in a manufacturing facility.

FIG. 4 illustrates an example manufacturing task 400 performed on a product 305 by an assembler 320 in a station 310. Station 310 does not have an elevated platform 315, such as a station 310 in example 300. In example 400, an assembler 320 can install a part 405 on a product 305 to the satisfaction of ergonomic constraints using a station 310 without resorting to any platforms 315. The system 200 can evaluate an arrangement of different stations 310 (e.g., with or without different platforms 315) for the purposes of installing parts, such as 405, during the course of product 305 assembly in order to identify the most efficient arrangement of stations 310 in a facility 325 for the purposes of the manufacturing process.

The present solution can relate to a system 200 that can use a data processing system (DPS) 205 to provide outputs, data, determinations or predictions of the manufacturing model 208 to remote clients 250. DPS 205 can receive product parts data 215 to identify one or more physical characteristics of a part 405 of a plurality of parts 405 of a product 305 (e.g., electric vehicle) to assemble. DPS 205 can identify a first constraint corresponding to ergonomic data (e.g., ergonomic data 225, ergonomic output 228) for assembling the part 405. DPS can identify a second constraint corresponding to the physical characteristics (e.g., products parts data 215) of the part 405. DPS 205 can generate, using the data input into a model of the data processing system and based on the first constraint and the second constraint, a sequence (e.g., product sequence output 218) identifying an order in which to assemble the part 405 into the product 305 with respect to assembly of the plurality of parts 405.

DPS 205 can determine the order in which the part 405 is to be assembled based on the physical characteristics (e.g., product parts data 215) of the plurality of parts 405. DPS 205 can use the manufacturing model 208 or facility sequence model 230 to select a station 310 of a plurality of stations 310 of a manufacturing facility 325 in which the part 405 is to be assembled into the product 305. DPS 205 can receive second data to identify time (e.g., ergonomics data 225) it takes to assemble each part 405 of the plurality of parts 405 and generate, based on the second data input into the facility sequence model 230, a cycle time 1305 to complete the assembly of the product 305.

DPS 205 can generate instructions to install the part 405 into a product 305 based on the sequence. DPS 205 can generate, by the facility sequence model 230, a second sequence (e.g., manufacturing plans 238) of a plurality of stations 310 of a facility 325 for assembly of the plurality of parts 405, the second sequence to select a station 310 of the plurality of stations 310 based on a placement of the part 405 within the product 305. DPS 205 can select the station 310 for the part 405 based on the ergonomic data. DPS 205 can select the station 310 based on a carrier platform 315 of the station 310.

DPS 205 can provide, in response to a request from a client 250 device, the sequence (e.g., product sequence output 218) to the client 250 device. The request can be a request from a virtual assistance function 255 of the client 250 directed to a user interface function 440. DPS 205 can provide, in response to a request from a virtual assistant function 255 on a client 250 device, information on stations 310 of a facility 325 in which the product 305 is assembled.

The present solution can provide a non-transitory computer-readable media having processor readable instructions, such that, when executed, causes a processor to perform functional tasks of the present solution. For example, the instructions can cause the processor to receive data identifying a physical characteristic of a part of a plurality of parts of a product to assemble. The instructions can cause the processor to identify a first constraint corresponding to ergonomic data for assembling the part. The instructions can cause the processor to identify a second constraint corresponding to the physical characteristics of the part. The instructions can cause the processor to generate, using the data input into a model of the data processing system and based on the first constraint and the second constraint, a sequence identifying an order in which to assemble the part into the product with respect to assembly of the plurality of parts.

Figure 5:
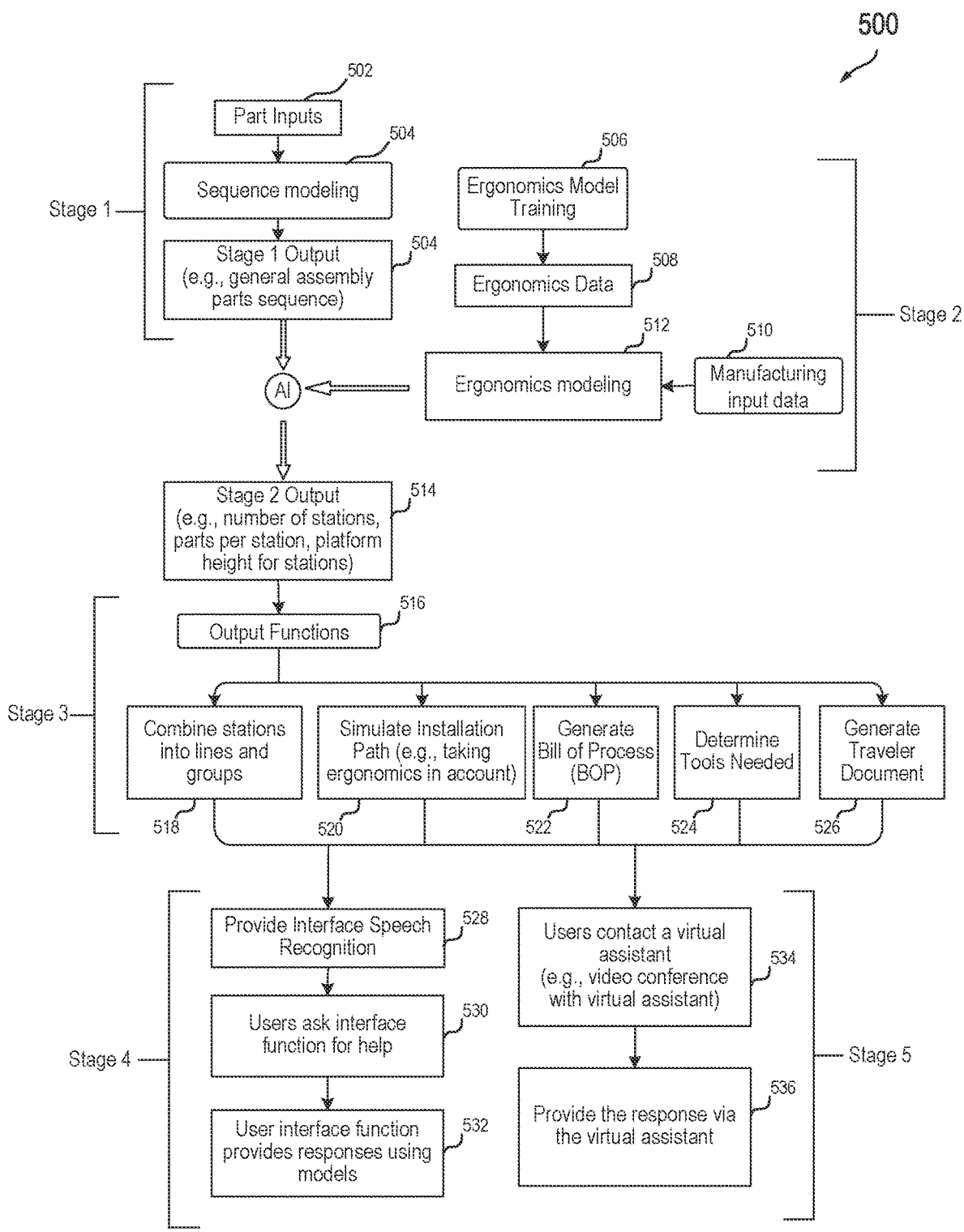
FIG. 5 depicts an example flow diagram of a method of implementing a model for a manufacturing and assembly process.

FIG. 5 depicts an example flow diagram of a method 500 of utilizing a DPS 295 with a manufacturing model 208 to generate and provide modeled outputs to users. Method 500 can include five stages in which the present solution can be implemented, processed or otherwise provided using the features of the system 200 in FIG. 2.

At stage 1, the method 500 can assemble the data of a product being into an AI model function to determine sequences or order in which the parts are to be assembled or the product to be manufactured. This can be implemented using parts inputs 502, for example, a model implemented in a python code along with APIs and a software for inputting drawings, geometrics, information on structure or materials and other physical characteristics of parts into the model function, referred to as for example a sequence modeling 502. Stage 1 outputs can include general assembly parts sequences 504, which can be included in the general stage 2 outputs.

At stage 2, the method 500 can generate the ergonomics data 508 that can be generated from a model training function 506 and which the model then can enter into an ergonomics modeling function 512. Additionally or alternatively, various input data from the manufacturing team (e.g., manufacturing input data 510) can also be entered into the ergonomics modeling function 512, such as data on facility stations or platforms. The ergonomics modeling function 512 can then provide a stage two output 514, which can, for example, determine features of the process, such as a number of stations used for the process, parts per station or platform heights on the stations.

For example, a data processing system can receive data identifying a physical characteristic of a part of a plurality of parts of a product to assemble. The data processing system can identify, by the data processing system, a first constraint corresponding to ergonomic data for assembling the part. The data processing system can identify a second constraint corresponding to the physical characteristic of the part. The data processing system can generate, using the data input into a model of the data processing system and based on the first constraint and the second constraint, a sequence identifying an order in which to assemble the part into the product with respect to assembly of the plurality of parts.

The data processing system can determine the order in which the part is to be assembled based on physical characteristics of the plurality of parts. The data processing system can select a station of a plurality of stations of a manufacturing facility in which the part is to be assembled into the product. The data processing system can receive second data to identify time it takes to assemble each part of the plurality of parts and generating, based on the second data input into the model, a cycle time to complete the assembly of the product. The data processing system can generate instructions to install the part into the product based on the sequence. The data processing system can generate, according to the model, a second sequence of a plurality of stations of a facility for assembly of the plurality of parts, the second sequence to select a station of the plurality of stations based on a placement of the part within the product. The station for installing the part can be selected based on the ergonomic data. The station for installing the part can be selected based on a carrier of the station. The data processing system can provide, in response to a request from a client device, the sequence to the client device. The data processing system can provide, in response to a request from a virtual assistant on a client device, information on a station of a facility in which the product is assembled.

At stage 3, the method 500 can receive the outputs 514 from the stage 2 and utilize output functions 516 to organize the output data to determine different aspects of the manufacturing or assembly process using the stage 2 outputs. For example, at stage 3 specific stations can be selected in a facility for a manufacturing process and specific manufacturing plans can be determined. At stage 3, outputs from stage 1 and stage 2 can be input into a model function to determine information related to stations of the facility for product production. At stage 3, the process can combine stations into manufacturing lines and groups of stations (518) based on their layout and platform configurations, simulate installation paths taking ergonomics into account (520), generate a bill of process (BOP) (522) identifying the assembly or manufacturing process, determine tools needed at each of the stations (524) or each stage of the process or generate a travel document for the product (526).

At stage 4, the method 500 can provide a user interface with speech recognition 528 to allow users to ask an interface function for help 530. The interface function can provide responses using the models of the present solution 532.

At stage 5, the method 500 can provide an advanced virtual assistance in which the users can interact with a virtual assistant 534 and the virtual assistant can provide assistance using the models of the present solution 536. One or more of 502-536 corresponds to respective ones of 605-645, 705-725, and 805-825.

Figure 6:
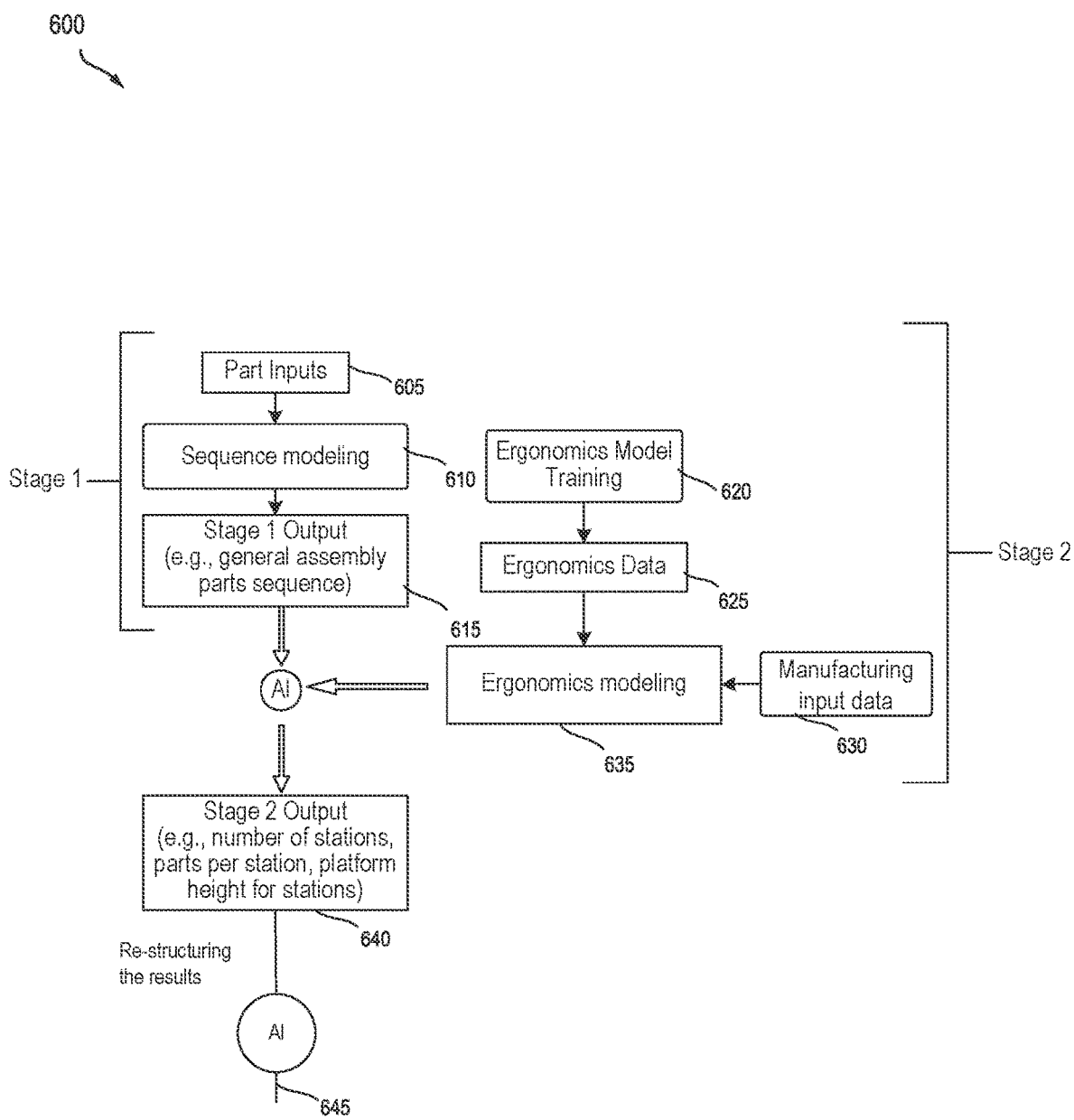
FIG. 6 is a flow diagram of an example method of implementing a model for generating a products sequence data and ergonomics data.

FIG. 6 depicts a close up view of an example flow diagram of a method 600 of the stages 1 and 2 of the method 500 of providing a manufacturing model 208 using system 200. Method 600 can include ACTS 605-645. Depending on the implementation, stages 1 and 2 of the method 500 can correspond to ACTS 605-635, or 605-640, or 605-645.

At ACT 605, the method 600 inputs the parts data that includes various physical characteristics of parts into a model, such as a sequence model. For example, data can include information, such as dimensions, materials, structure, weights or geometry of any one or more of: body system, chassis system, interior system, powertrain, energy storage, thermal system, electrical system or any other part of the product. Data can be input into a model using a variety of tools. For example, data can be input in the form of data sheets, schematics, mechanical or electrical drawings or any other files, data or information on the parts, subassemblies or systems.

At ACT 610, the method 600 uses the sequence model to provide sequencing or determine the order in which the parts are to be assembled, manufactured or fabricated. The model can determine the order or the sequence of parts by trying different orders in which the parts can be assembled and determine the time that it takes to assemble them. The sequence model can identify the sequence based on any number of constraints. or example, the sequence model can determine or identify the sequence which results in the produced or assembled product in the shortest amount of time, or using only a particular number of, or type of, manufacturing stations, or using only a particular set of tools or personnel. The modeling function or a model can be implemented using for example a python model and code which can be used along with application programming interface (API) calls to a software on part and system drawings, such as Delmia, to enter parts data into the model.

At ACT 615, the method 600 can provide the stage 1 output. The stage 1 output can include a general assembly parts sequence, which can order the parts from the first part of the product to install or assemble to the last part of the product to install or assemble. The sequence or order can be organized based on the data (e.g., dimensions, sizes, geometries) of the parts. The sequence can be organized to most efficiently assemble the product using the parts, including within any number of constraints or limitations, such as the number of stations used, number of assemblers available, the types of stations and platforms available or any other limitation that a facility may face.

At ACT 620, the method 600 can perform the ergonomics model training using ergonomics data for determining acceptable ergonomic constraints for installation or assembly of various parts of a product. The data can be entered into an ergonomics model to make predictions, which can then be tested and updated based on the training data. Using the training data the model can be continuously improved using this cycle. Ergonomics model training function can include and utilize any AI or ML training methodology, including for example neural network functions.

At ACT 625, the method 600 can utilize the ergonomics data from the ergonomics model training to input it into the ergonomics model. The input data can include, for example, virtual human ergonomics, virtual human cycle time for performing installation tasks, design for manufacturability standards for installation simulations or any constraints for installing parts or completing any part of a fabrication or an assembly process.

At ACT 630, inputs from the manufacturing team (e.g., engineers and technicians) can be gathered and entered into a model (e.g., ergonomics model). The inputs from the manufacturing team can include available physical space data for a facility or stations, or any other data on the space, tools, elevations in the stations, facility or the product. Inputs from the manufacturing can include information on the number of assemblers available, tools available, features or platforms of stations that are available, the order of stations or any constraints on the stations or space in which installations are to be performed.

At ACT 635, the method 600 can run the ergonomics modeling function (e.g., an AI or ML ergonomics model). The modeling function can be run or implemented using API functions or software inputs that can be used for inputting data into the model for the facility. The output of the ergonomics model can include ergonomic constraints to any of the product parts. The model can identify which of the parts can be installed at which stations to the satisfaction of the ergonomics constraints and which parts would rely on particular platforms, tools or stations in order to meet the ergonomics constraints. The ergonomics model can provide one or more restrictions to particular arrangements of data At ACT 640, upon running the AI or ML modelling function, the method 600 can receive the output from the sequence model at ACT 610 (e.g., general assembly parts sequence) and outputs from the ergonomics model at ACT 635 (e.g., ergonomics data or constraints). The model can produce various types of outputs. For example, the model can produce output data on stations to use for installations, such as the listing of stations, the number of stations, number parts per station, platform height for each station, tools used at each station, the number of assemblers at each station and more. The model can produce the sequence of parts to assemble within the constraint of the ergonomics for each station. The model can produce, for example, configurations for stations, the order of stations, the arrangement of tools and assemblers and installation instructions.

At ACT 645, the outputs from ACT 640 can be fed into one or more output functions for providing output data to the users. The output functions can include features at stage 3, which are further described in connection with FIG. 7.

Figure 7:
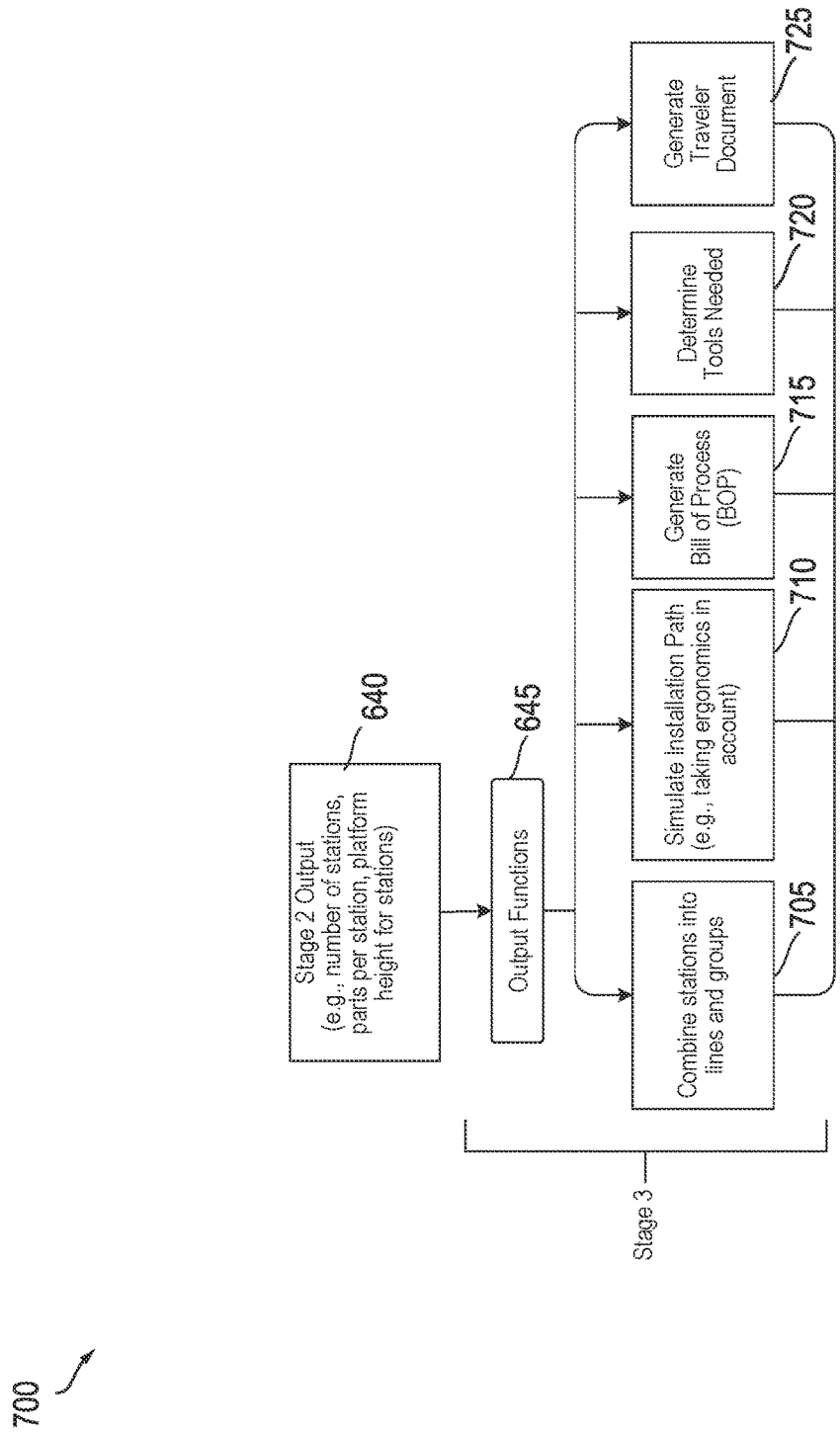
FIG. 7 is a flow diagram of an example method of implementing a model for providing manufacturing sequence and plans.

FIG. 7 depicts a close up view of an example flow diagram of a method 700 of the stage 3 of the method 500 of providing a manufacturing model 208 using system 200. Method 700 can include ACTS 705-725, but also, depending on the implementation, it can include or interact with ACTS from stages 1 and 2, such as ACTS 640 and 645. For example, the method 700 can access stage 2 output data at ACT 640 from output functions 645 to address any inputs from the users utilizing the solution.

At ACT 705, method 700 can utilize the output functions from ACT 645 to access output data to gather, generate or provide data on combining different stations into lines or groups used for a manufacturing process. For example, output functions can provide a selection or order of stations based on their platform height, ergonomics data or constraints. For example, output functions can identify particular stations with platforms for installing particular products, such as parts that may need to be installed at particular height levels due to ergonomic constraints. As the ergonomic constraints can be determined based on the ergonomic model and the geometries, the weight of the product or other material or physical characteristics can cause the output functions to provide different selections of stations in different arrangement.

For example, based on the combination of platforms at ACT 705, the method 700 can determine the number lines or groups, such as the chassis line of stations in which chassis are assembled, trim lines of stations in which trims are assembled, final lines of stations in which the product is finalized. Depending on the desired optimization function (e.g., such as functions to optimize for shortest amount of time, most efficient space or least number of assemblers or tools) the method 700 can arrange the placement of such stations in a facility, the size and shape of the stations, the types of equipment or tools for each of the stations and the number of assemblers for each of the stations.

At ACT 710, the method can access and provide, from the output functions, simulate installation paths that take ergonomics into account. For example, model can determine the order of stations being used based on the station characteristics (e.g., presence of platforms to satisfy ergonomics or presence of tools. For example, the method can provide or generate a job element sheet (JES) based on the simulation of installation path. The JES can include the instructions for the assemblers to complete the production of the product.

At ACT 715, the method can access and provide, from the output functions, a complete bill of process. The bill of process can include description or information on the process of entire production, including the sequence of products to install, at which stations, using which tools, using which installers or teams of installers. The bill of process can also include cycle times for each part, several parts, systems or product as a whole.

At ACT 720, the method can access and provide, from the output functions, the listing or description of tools needed to perform the installations. For example, the model can determine reporting or non-reporting tools, tool locations or controllers locations. The method can identify different tools for different stations responsive to the ergonomics data or constraints for particular parts to be installed at each such station.

At ACT 725, the method can access and provide, from the output functions, the travel document for the product. The travel document can identify the order of stations for the product to go through in order to be manufactured and finalized. For example, the travel document can include the sequence of stations through which the product should pass, along with each of the parts to be installed at each station, in order for the assembly of the product to be complete.

Each of the outputs from ACTS 705-725, the method 700 can provide or make available to the user functions or interfaces for communicating with users or for allowing the users to communicate with virtual assistants via various user devices, such as for example discussed in connection with FIG. 8.

Figure 8:
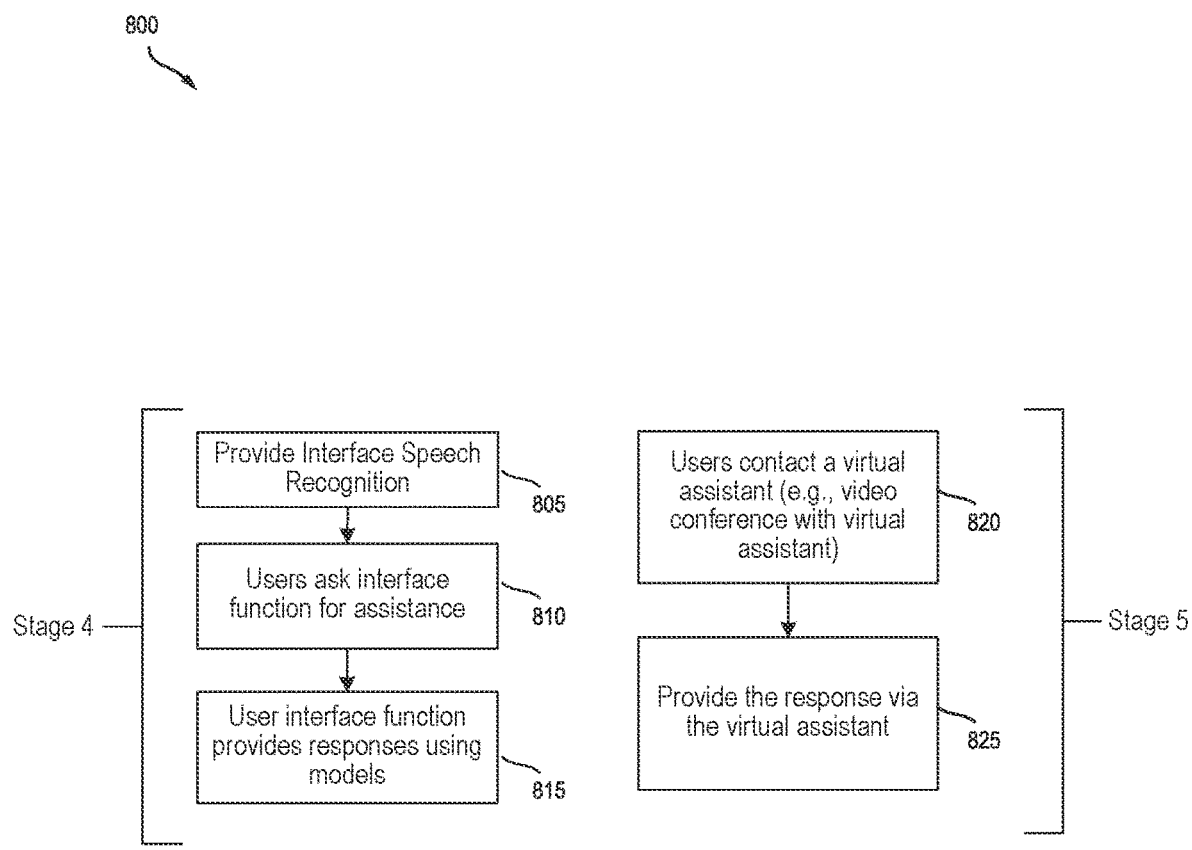
FIG. 8 is a flow diagram of an example method of implementing a virtual assistant for user interaction with a manufacturing and assembly model.

FIG. 8 depicts a close up view of an example flow diagram of a method 800 of the stages 4 and 5 of the method 500 of providing a manufacturing model 208 using a system 200. Method 800 can include ACTS 805-825, but also, depending on the implementation, it can include or interact with outputs from ACTS from stage 3, such as outputs in ACTS 705-725. At ACT 805, the method can provide interface speech recognition. At ACT 810, the method can allow users to ask interface function for assistance. At ACT 810, the method can provide a user interface function to provide responses to the users using models of the present solution. At ACT 815, users can contact a virtual assistant. At ACT 820, the method can provide the response via the virtual assistant to the users.

At ACT 805, the method can provide a user interface function, such as an interactive speech recognition function. The speech recognition function can be integrated into the system and provided via the user interface to user devices. Speech recognition system or a function can be based on a proxem platform. Other interaction functionalities can be used, including written or other verbal or non-verbal communication functionalities.

At ACT 810, the method can provide functionality for the users to interact with the interface function. For example, users can ask the virtual assistant function to perform tasks in a program software, such as a software for viewing or accessing mechanical drawings or schematics of parts. For example, a user can ask the virtual assistant to show an RPV, show a final line 2, show station 3, or simulate installing of a windshield in an electric vehicle. The virtual assistant can provide or display this information, from the model(s), via the network and the virtual assistant function on the client devices.

At ACT 815, the method can utilize the user interface function to provide responses to the user requests. For example, in ACT 810 a user can ask the virtual assistant to change parts location, add more parts, move parts from one station to another. In ACT 815, in response to the request, the interface speech recognition function can identify the user request, utilize the models on the data processing system, and provide the requested information. For example, the user interface function can provide a list of tools, a list of stations, the station in which a particular part is assembled or any other response to a user request.

At ACT 820, the method can receive inputs from the users for a virtual assistant. For example, the user interface function can provide a virtual assistant function via the user interface. The user interface function can allow users to access virtual assistant users using an application that the users can access with their personal devices. The users can utilize a video conference function or a tool, such as video conference software, to communicate with the virtual assistance using APIs.

At ACT 825, the virtual assistant can provide responses to any user requests or questions. For example, various types and forms of APIs can be used to provide communication between the video conference and the virtual assistance tool or figure. For example, virtual assistance functions can be provided to the users via user devices (e.g., mobile devices, personal computers or tablets). A virtual assistant can provide a figure in a video which can communicate (e.g., listen, speak, write and read) information or data to and from the clients. Virtual assistant can react to instructions or requests and can access or use model(s) and provide modeled data or outputs to the users. Virtual assistant can provide output functions data in response to user requests. Virtual assistant can open or utilize software, any of the models, tools or functions of the system, in response to user request.

Figure 9:
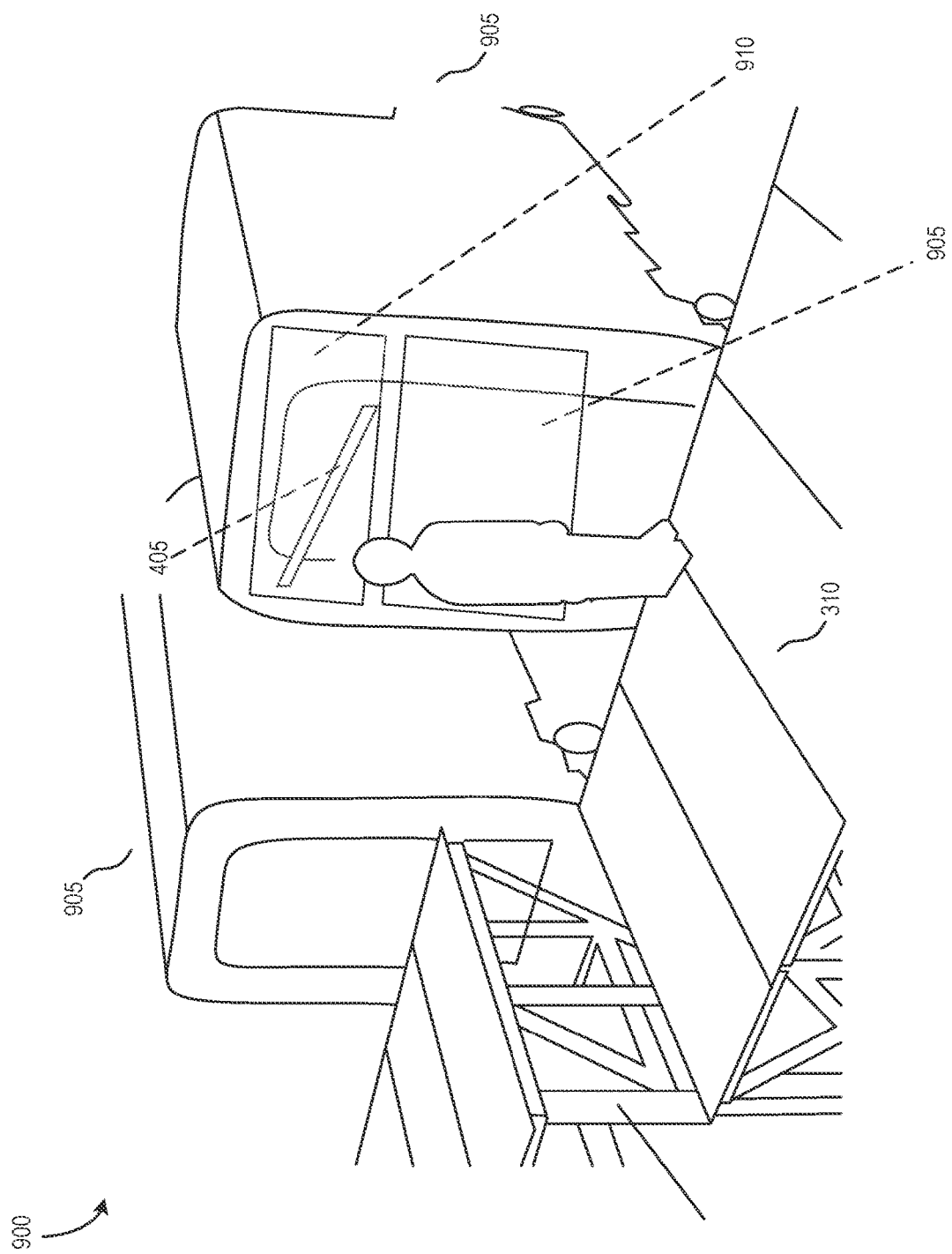
FIG. 9 depicts a diagram of a manufacturing model output of an assembly at a station using ergonomics data.

FIG. 9 illustrates an example manufacturing task 900 performed on a product 305 by an assembler 320 in a station 310. In the example 900, the model 208 of the present solution can determine that an assembler 320 cannot install a part 405 on a product 305 to the satisfaction of ergonomic constraints. For example, the model 208 of the present solution can determine that part 405 is in the ergonomic red zone 910, which is outside of the ergonomic green zone 905 within which the product 405 could be installed by the assembler 320 to the satisfaction of the ergonomic constraints. Based on this determination, the model 208 can identify an alternative station 310 in the facility 325 in which this particular part 405 should be installed within the ergonomic green zone 905, such as for example using a station 310 that includes a suitable raised platform 315 placing the assembler 320 within the ergonomic green zone 905.

Figure 10:
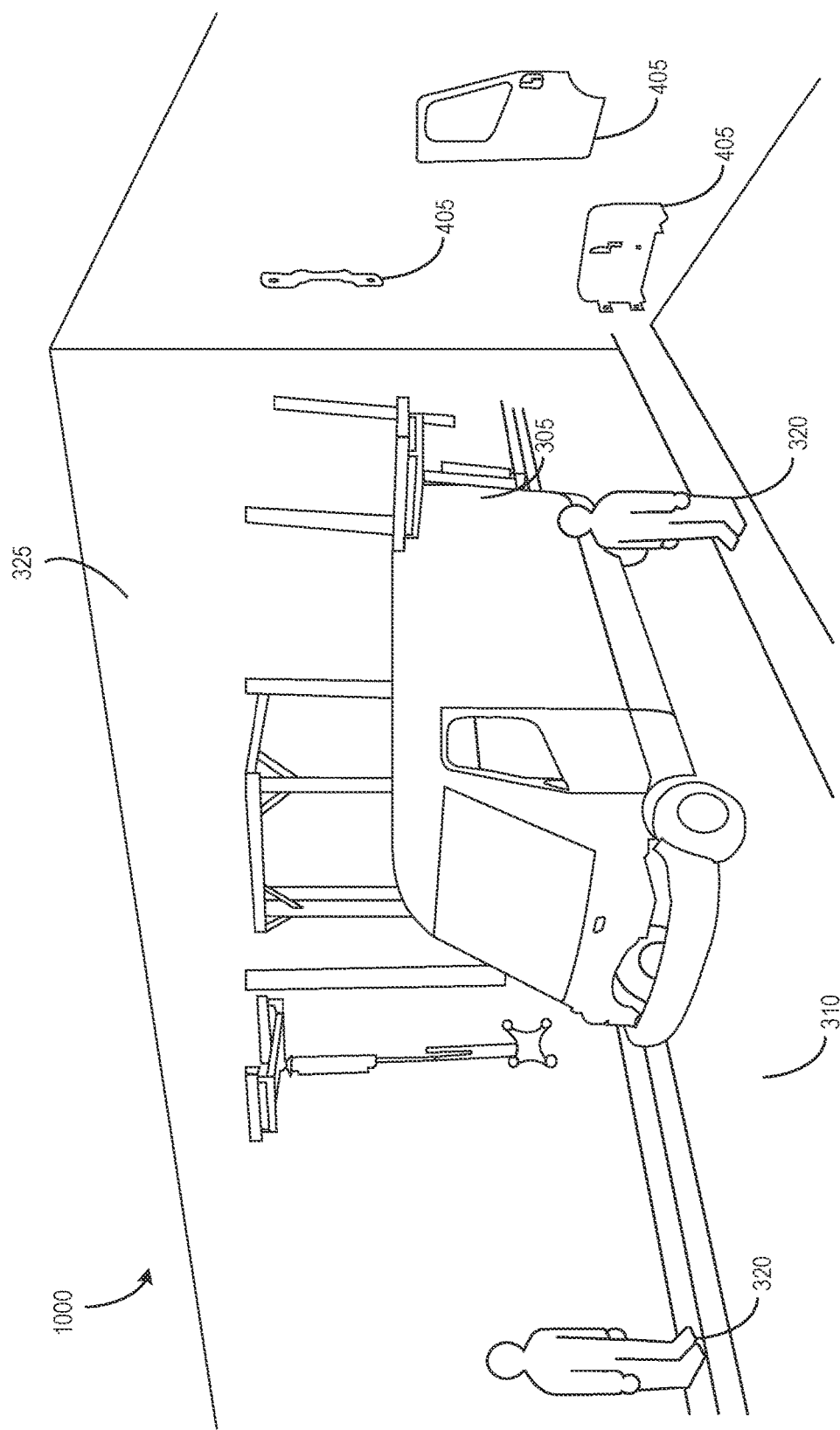
FIG. 10 depicts a diagram of a manufacturing model output of a station at an assembly line of a manufacturing facility along with parts for the station.

FIG. 10 illustrates an example manufacturing task 1000 performed on a product 305 by multiple assemblers 320 in a station 310 that does not have platform and that is included among many stations 310 in a manufacturing facility or plant 325. In the manufacturing task 1000, multiple parts 405 can be installed by the assemblers 320 at the station 310, based on the model output.

Figure 11:
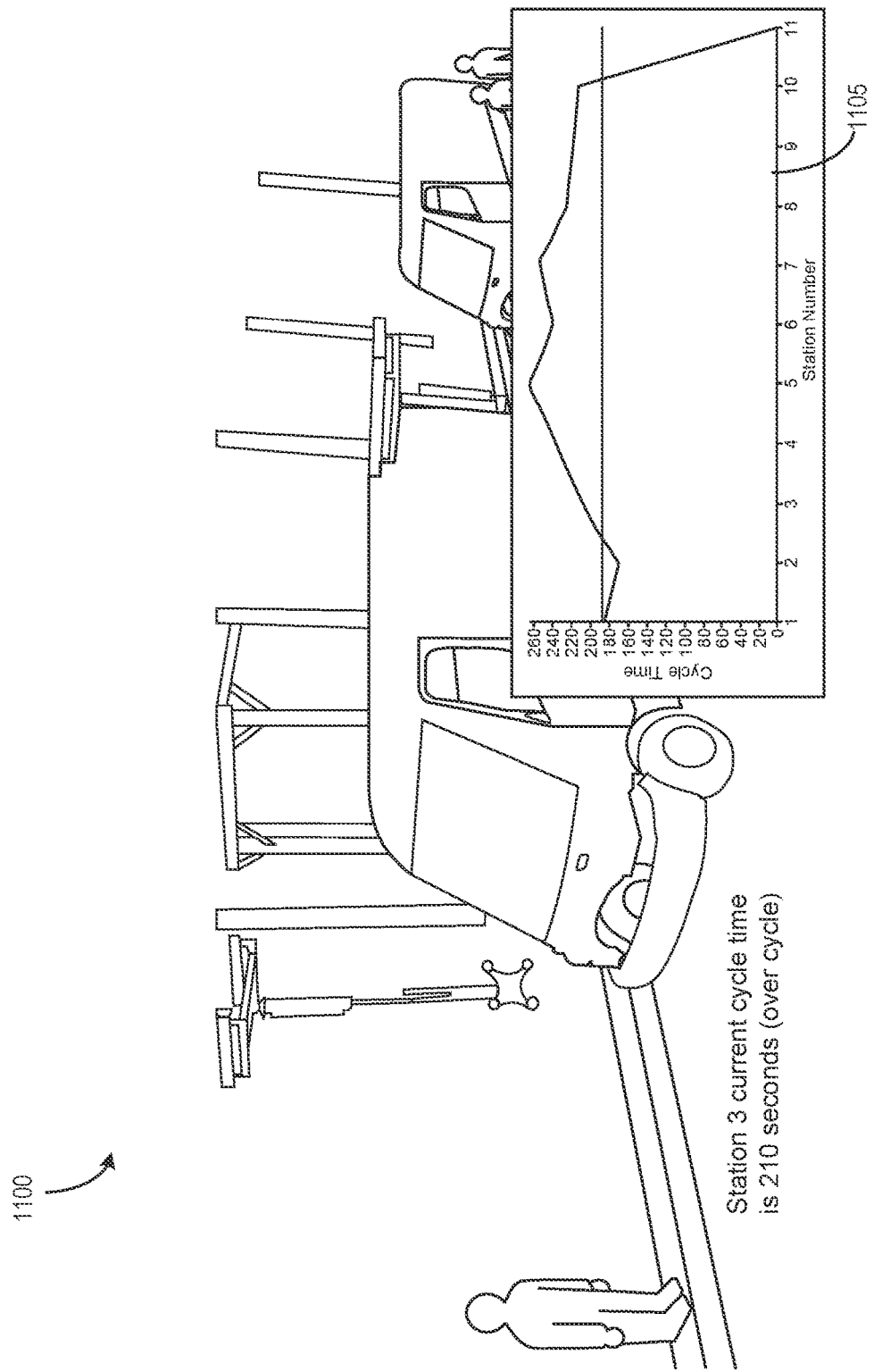
FIG. 11 depicts a diagram of a manufacturing model output of a station at an assembly line of a manufacturing facility along a graph of modeled time sequence for an assembly task.

FIG. 11 illustrates an example of the manufacturing task 1100 that can be similar to the manufacturing task 1000, performed on a product 305, in which a cycle time 1105 for installation of one or more parts is provided. The cycle time 1105 can provide a particular time duration (e.g., 210 seconds) for installing a particular part 405 into the product 305, per the model output.

Figure 12:
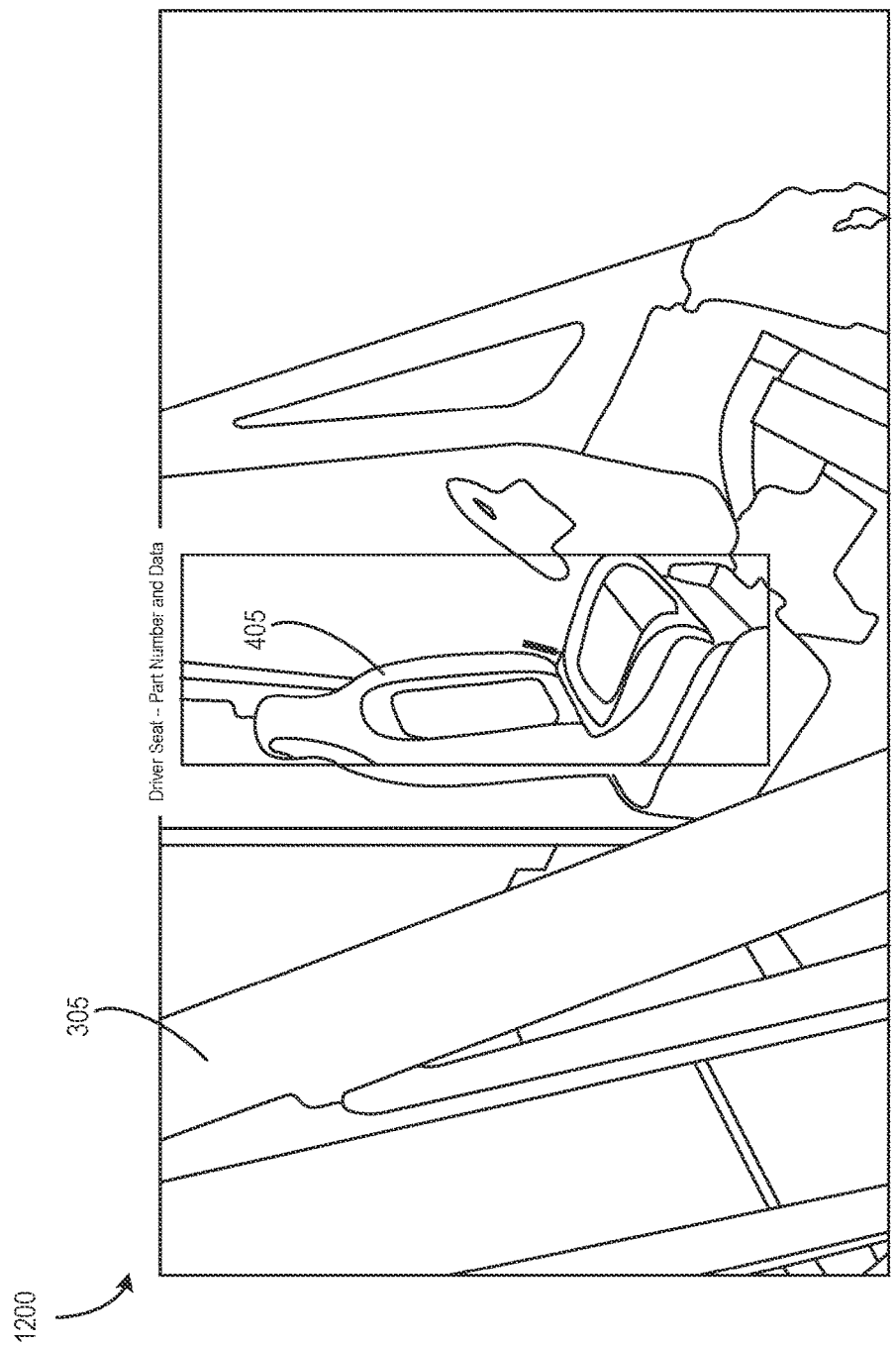
FIGS. 12-17 depict examples of screenshots of manufacturing model outputs.

FIGS. 12-17 examples of screenshots of manufacturing model outputs. For example, FIG. 12 illustrates an example screenshot of a manufacturing model output 1200 of a manufacturing task involving a part 405 corresponding to a vehicle seat (e.g., driver seat). Model output 1200 can provide description of the part 405, part number and other data, including physical dimensions of the part 405 and its assembly view within the product 305.

Figure 13:
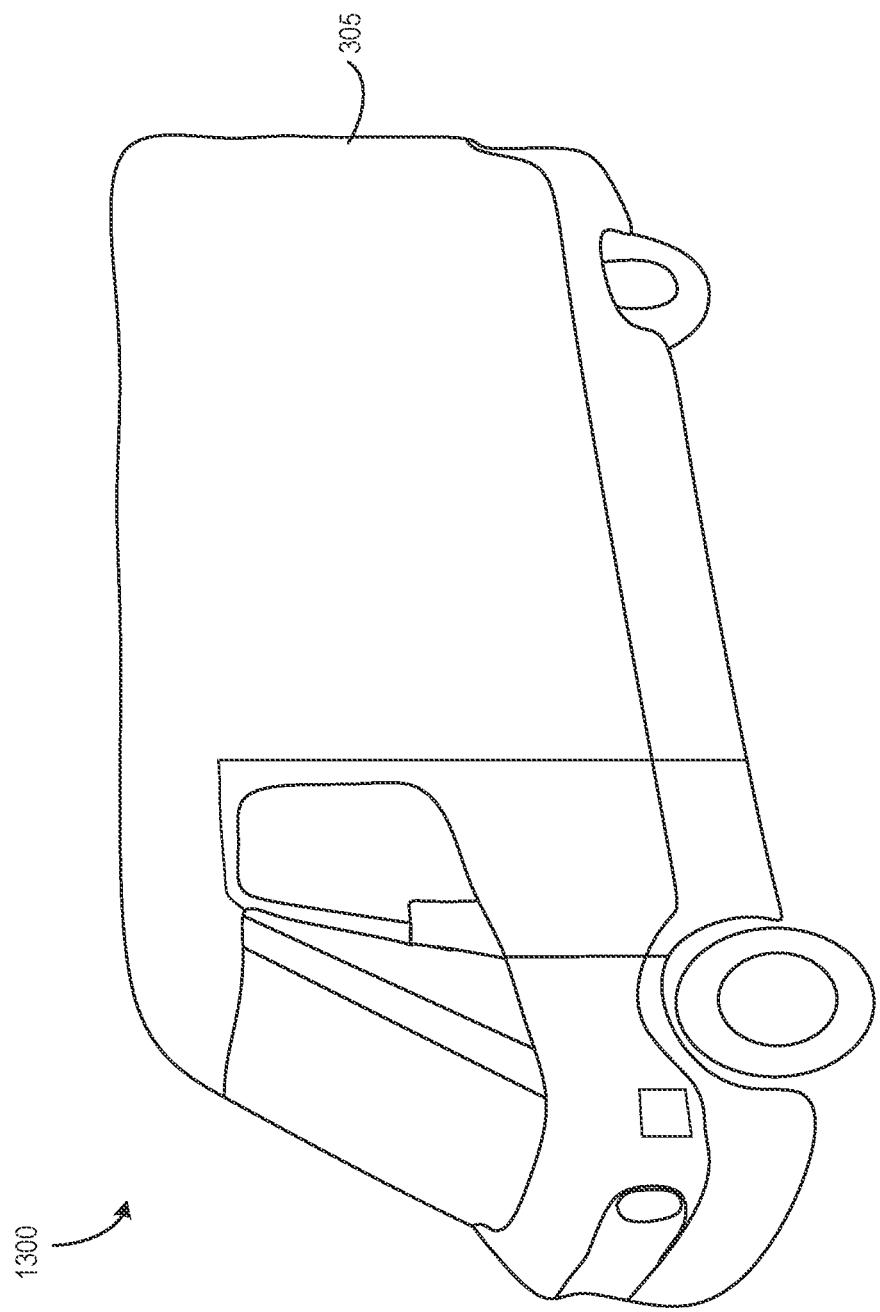

FIG. 13 illustrates an example of a screenshot of a model output 1300 of an assembled product 305 illustration whose process of fabrication, production or assembly is modeled by the manufacturing model. Although the illustrated example includes a vehicle, the product 305 can include any product comprising any number of parts, including any systems and subassemblies of the product.

Figure 14:
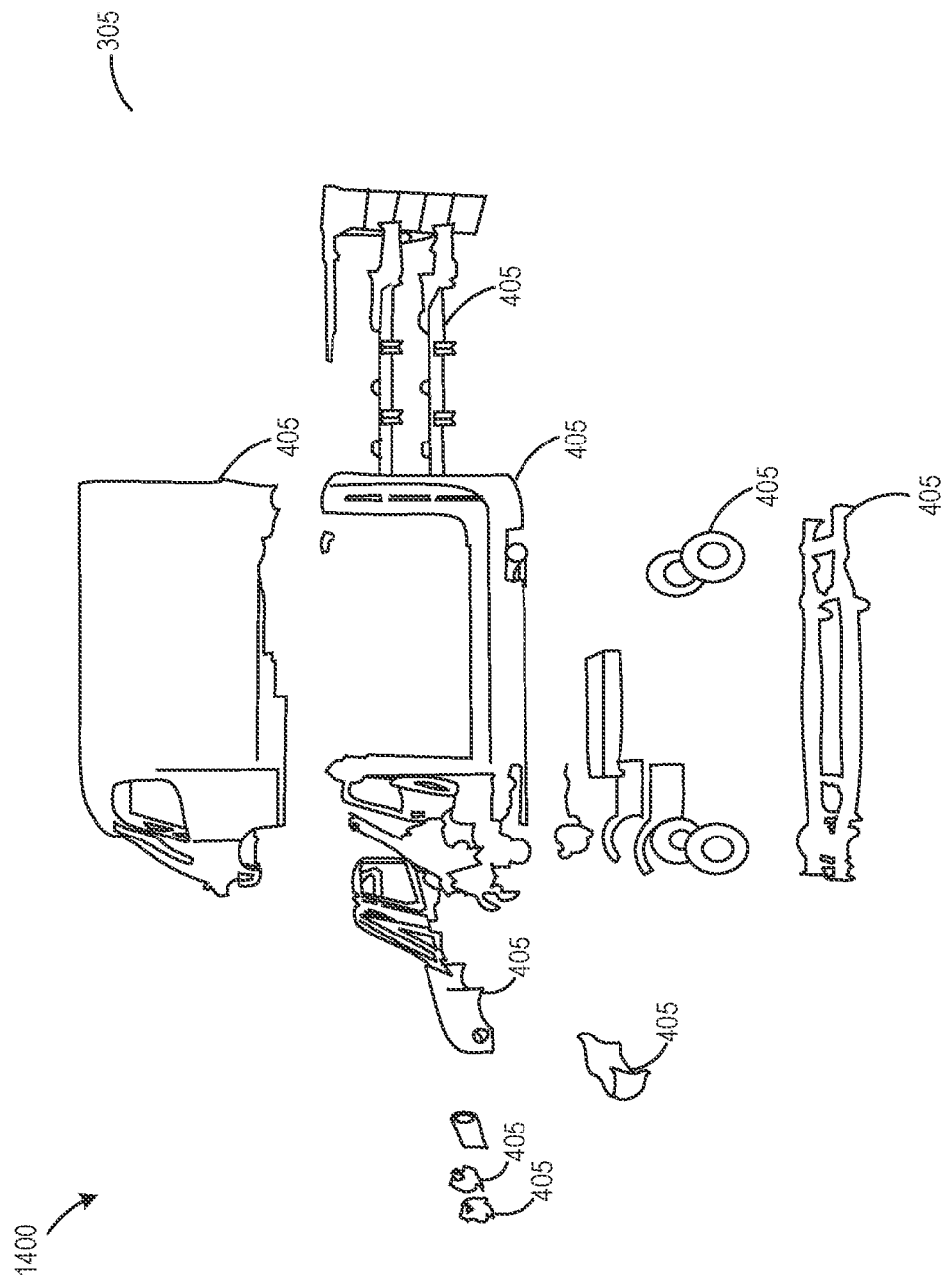

FIG. 14 illustrates an example of a model output 1400 of an exploded view of a product 305 illustration whose process of fabrication, production or assembly is modeled by the manufacturing model. The model output 1400 of the exploded view can illustrate the product 305 along with its parts, systems or subassemblies 405.

Figure 15:
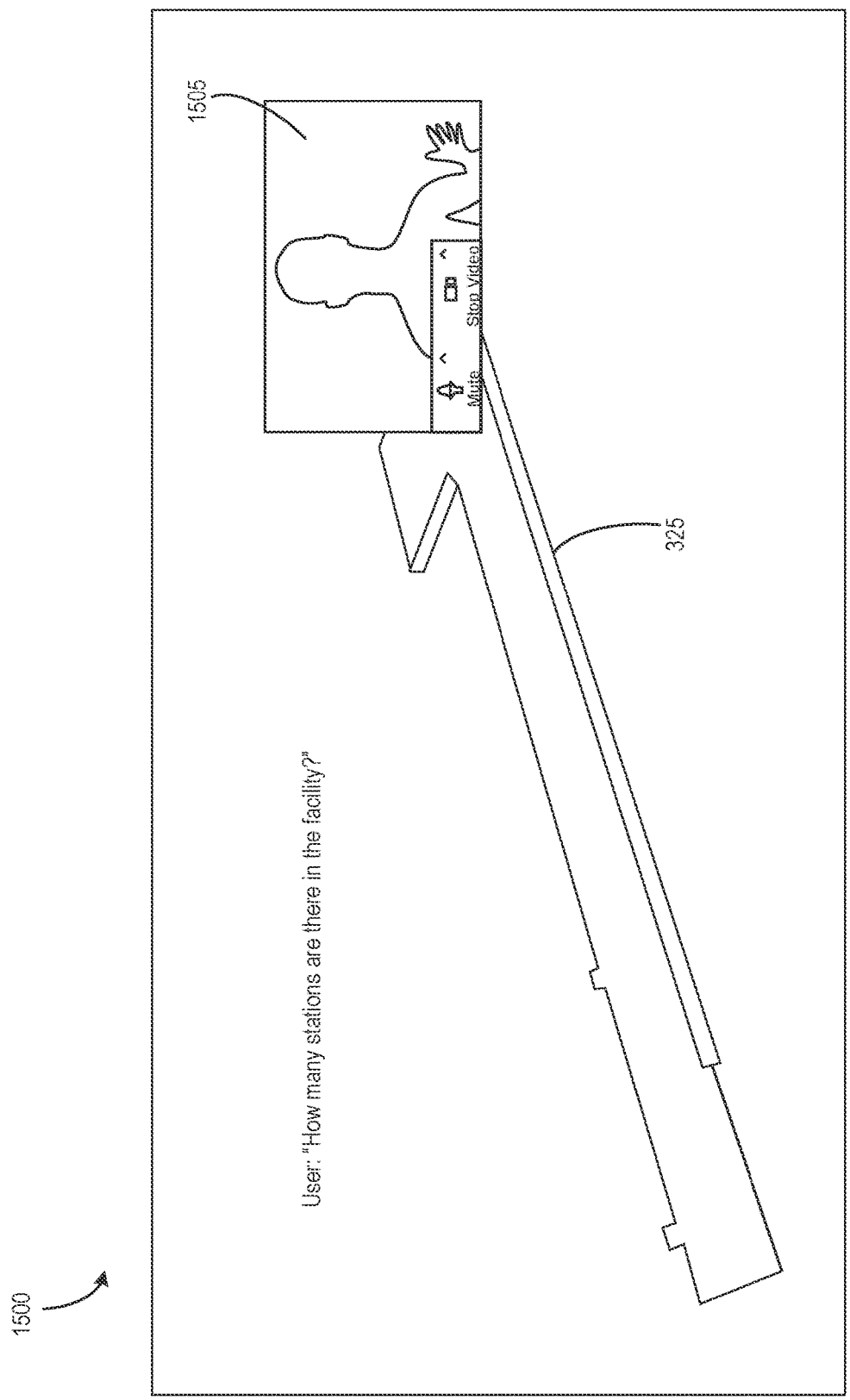

FIG. 15 illustrates an example of an output 1500 of a view, such as a plan, of a manufacturing plant or facility 325 along with an illustrated virtual assistant 1505 presented in the graphical user interface. The output can include, for example, a graphical user interface output corresponding to a modelled facility 325 in which stations are organized in a most efficient fashion, such as to expedite manufacturing using the modeling of the present solution. Virtual assistant 1505 can provide explanations, answer questions or provide details on the illustrated model output 1500 of the manufacturing plant or facility 325.

Figure 16:
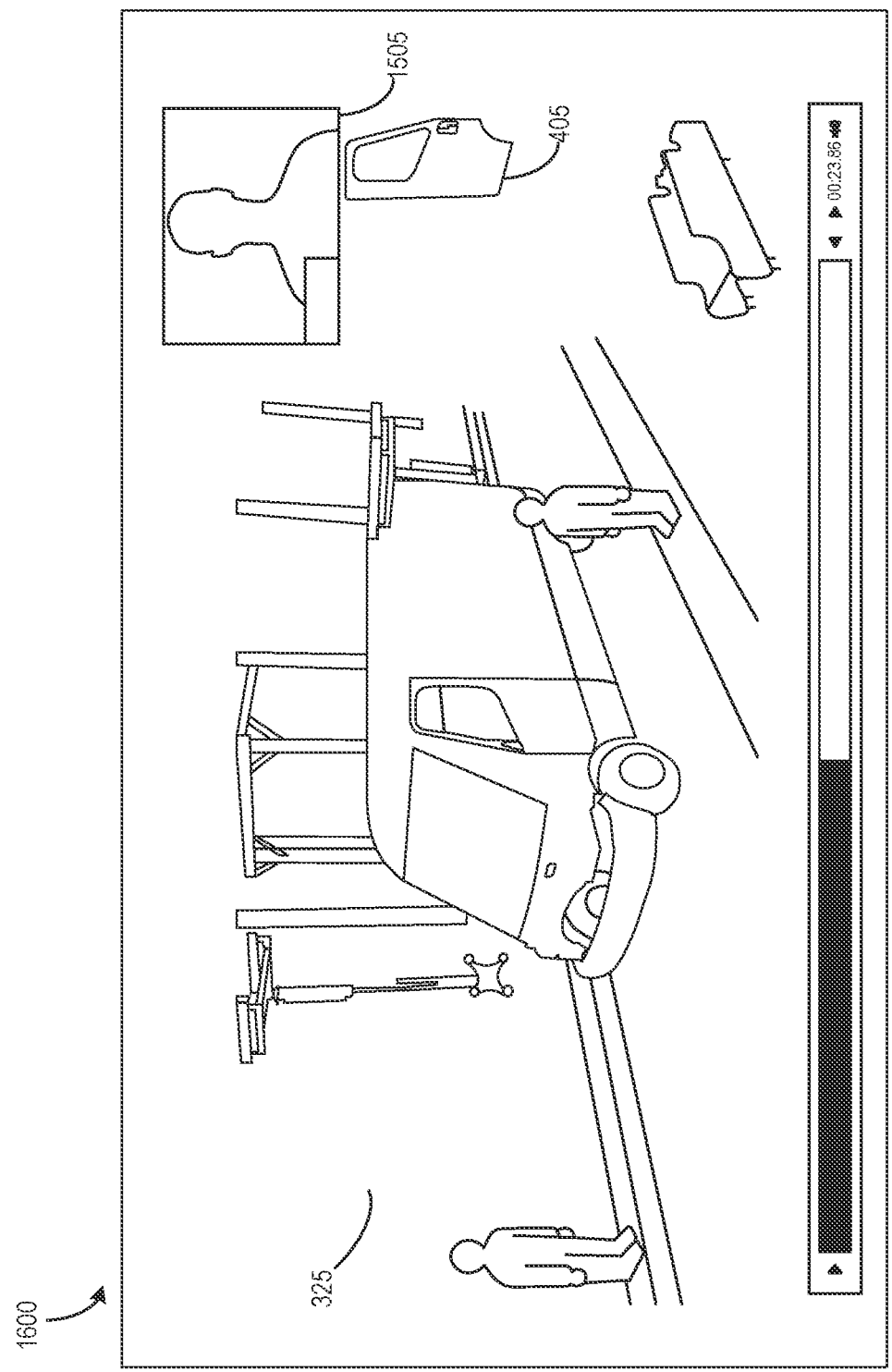

FIG. 16 illustrates an example of a output 1600, such as a graphical user interface output, of a manufacturing facility 325 presented along with a virtual assistant 1505 and parts 405 for the product 305. Virtual assistant 1505 can provide or discuss details on the parts 405 and their assembly in a particular part of the manufacturing facility 325, such as a station 310.

Figure 17:
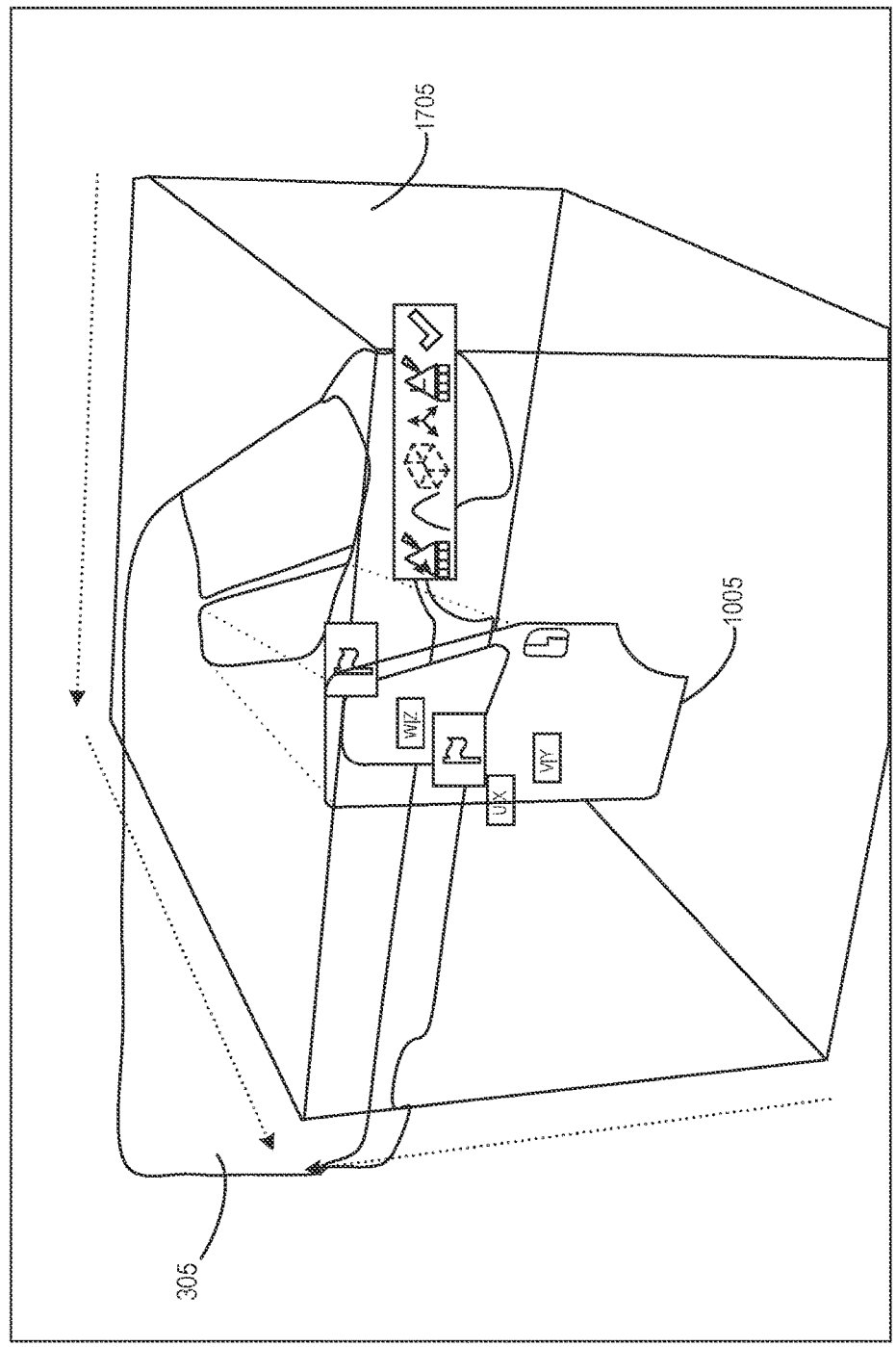

FIG. 17 illustrates an example of a model output 1700 of an installation task 1705 presented in a graphical user interface. The installation task 1705 presents a part 405 (e.g., a door) being assembled or installed onto the product 305. Installation task 1705 can provide information on how the part 405 fits onto the product 305, including the dimensions, the interface, the tolerances, and other details, as modeled by the manufacturing model.

Figure 18:
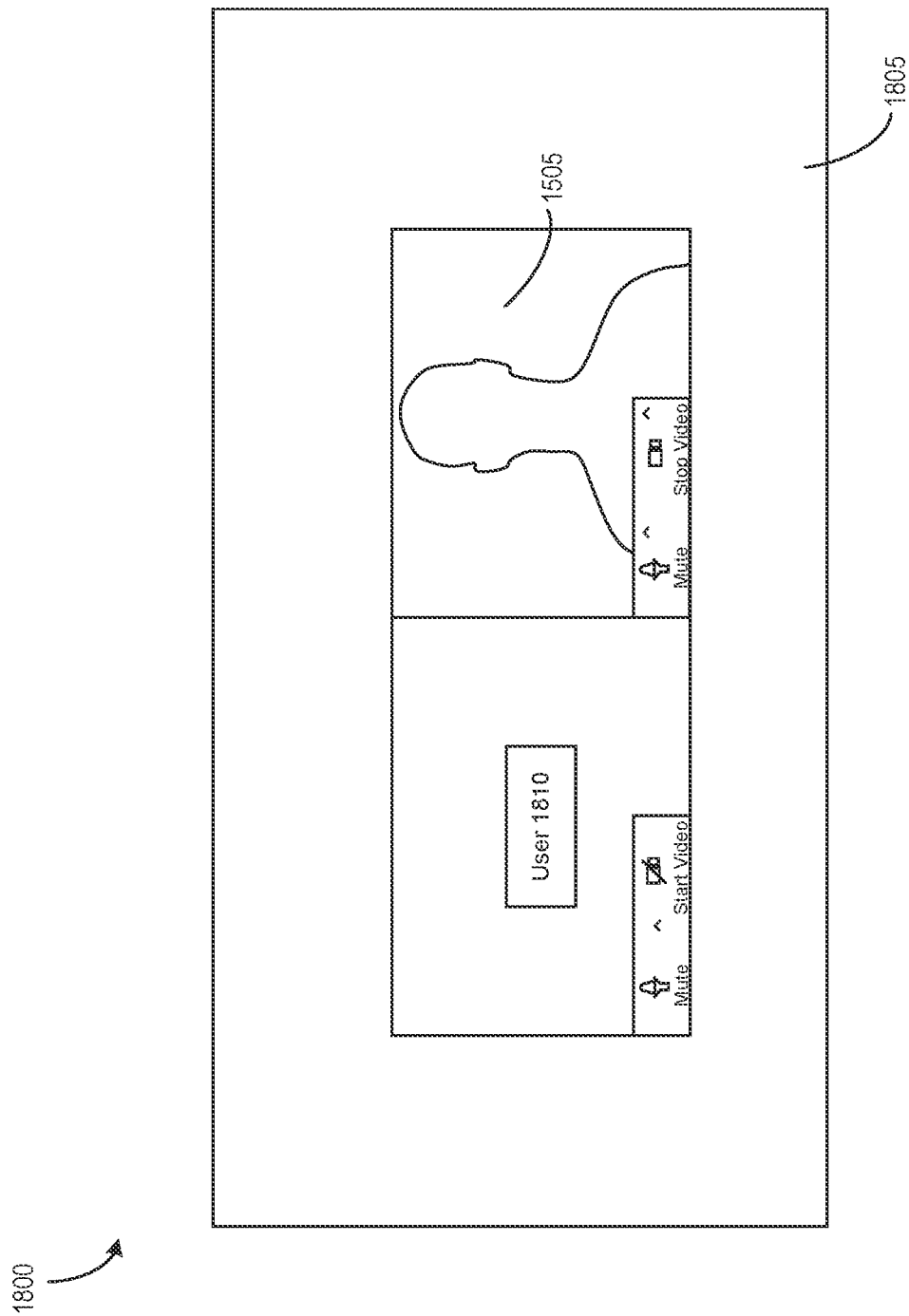
FIG. 18 depicts an example of a graphical user interface for communicating with a virtual assistant in accordance with an embodiment of the present solution.

FIG. 18 illustrates an example of a screenshot 1800 of a user interface 1805 in which a user 1810 can communicate with a virtual assistant 1505 via. Using the interface 1805, via a user interface function 240, the user 1810 can communicate with the virtual assistant 1505 to ask questions, the answers to which the system 200 can provide using the model 208.

Figure 19:
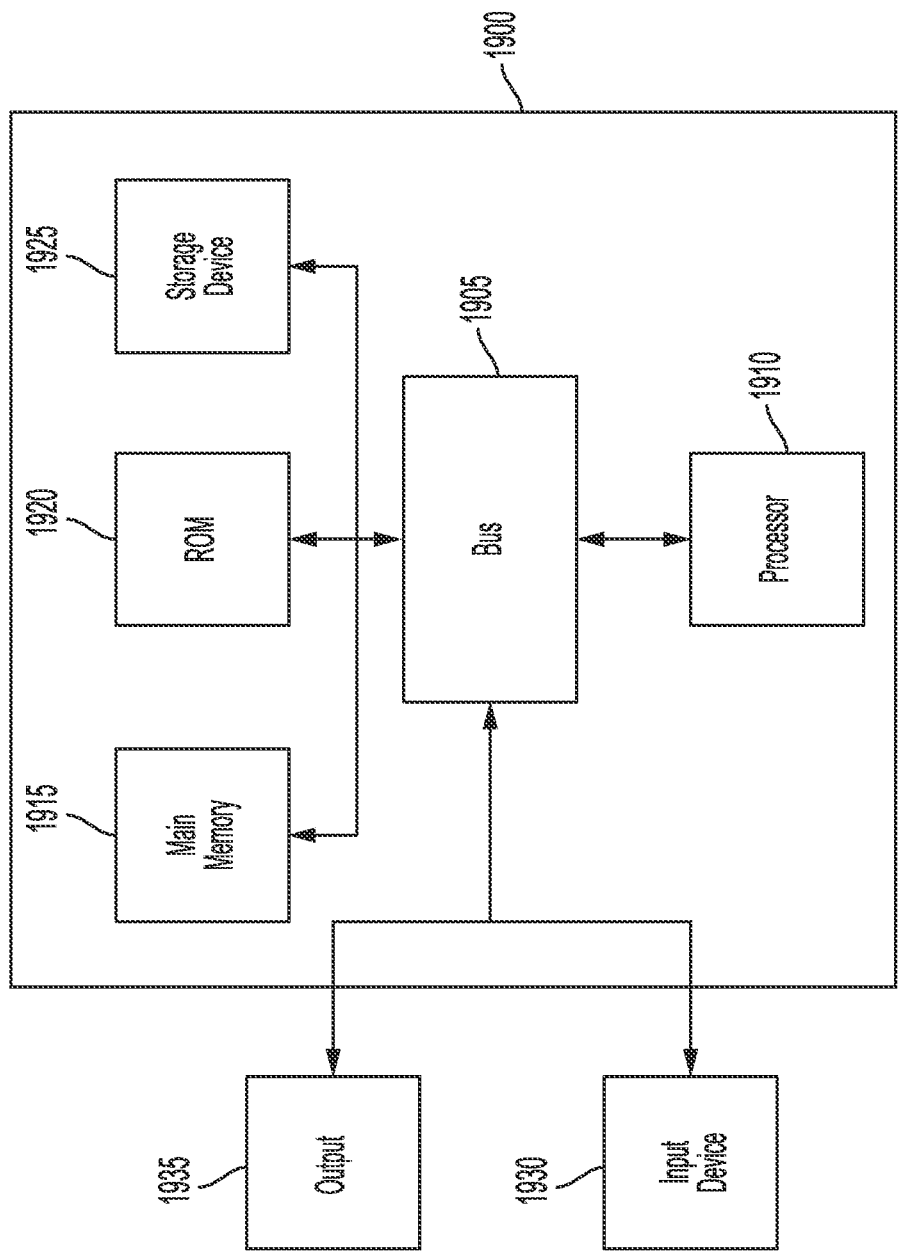
FIG. 19 is a block diagram illustrating an architecture for a computer system that can be employed to implement elements of the systems and methods described and illustrated herein.

FIG. 19 depicts an example block diagram of an example computer system 1900. The computer system or computing device 1900 can include or be used to implement a data processing system or its components. The computing system 1900 includes at least one bus 1905 or other communication component for communicating information and at least one processor 1910 or processing circuit coupled to the bus 1905 for processing information. The computing system 1900 can also include one or more processors 1910 or processing circuits coupled to the bus for processing information. The computing system 1900 also includes at least one main memory 1915, such as a random access memory (RAM) or other dynamic storage device, coupled to the bus 1905 for storing information, and instructions to be executed by the processor 1910. The main memory 1915 can be used for storing information during execution of instructions by the processor 1910. The computing system 1900 may further include at least one read only memory (ROM) 1920 or other static storage device coupled to the bus 1905 for storing static information and instructions for the processor 1910. A storage device 1925, such as a solid state device, magnetic disk or optical disk, can be coupled to the bus 1905 to persistently store information and instructions.

The computing system 1900 may be coupled via the bus 1905 to an output 1935, such as a liquid crystal display, or active matrix display, for displaying information to a user or to a speaker or a network interface node. An input device 1930, such as a keyboard or voice interface may be coupled to the bus 1905 for communicating information and commands to the processor 1910. The input device 1930 can include an output device 135, such as a touch screen display. The input device 1930 can also include a cursor control, such as a mouse, a trackball, or cursor direction keys, for communicating direction information and command selections to the processor 1910 and for controlling cursor movement on the display 1935.

The processes, systems and methods described herein can be implemented by the computing system 1900 in response to the processor 1910 executing an arrangement of instructions contained in main memory 1915. Such instructions can be read into main memory 1915 from another computer-readable medium, such as the storage device 1925. Execution of the arrangement of instructions contained in main memory 1915 causes the computing system 1900 to perform the illustrative processes described herein. One or more processors in a multi-processing arrangement may also be employed to execute the instructions contained in main memory 1915. Hard-wired circuitry can be used in place of or in combination with software instructions together with the systems and methods described herein. Systems and methods described herein are not limited to any specific combination of hardware circuitry and software.

Although an example computing system has been described in FIG. 19, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A data processing system, comprising:
   a memory; and
   a processor coupled to the memory, the processor configured to:
   receive data identifying a physical characteristic of a part of a plurality of parts of a product to assemble;
   identify a first constraint corresponding to ergonomic data for assembling the part;
   identify a second constraint corresponding to the physical characteristic of the part;
   generate, using the data as an input into a model of the data processing system and based on the first constraint and the second constraint, a sequence identifying an order in which to assemble the part into the product with respect to assembly of the plurality of parts; and
   select, using the model and based on physical characteristics of one or more assembly stations, a first assembly station of the one or more assembly stations for installing the part according to the physical characteristics of the first assembly station.

2. The data processing system of claim 1, comprising the processor configured to:
   determine the order in which the part is to be assembled based on physical characteristics of the plurality of parts.

3. The data processing system of claim 1, comprising the processor configured to:
   receive second data to identify an amount of time it takes to assemble each part of the plurality of parts; and
   generate, based on the second data being input into the model, a cycle time to complete the assembly of the product.

4. The data processing system of claim 1, comprising the processor configured to;

generate instructions to install the part into the product based on the sequence.

5. The data processing system of claim 1, comprising the processor configured to generate, according to the model, a second sequence for assembly of the plurality of parts, the second sequence to select the first assembly station based on a placement of the part within the product.

6. The data processing system of claim 1, comprising the processor configured to;
select, according to the model, the first assembly station for installing the part according to the ergonomic data and a carrier platform on the first assembly station.

7. The data processing system of claim 1, comprising the processor configured to:
provide, in response to a request from a client device, the sequence to the client device.

8. The data processing system of claim 1, comprising the processor configured to:
provide, in response to a request from a virtual assistant on a client device, information on the first assembly station in which the product is assembled.

9. A method, comprising:
receiving, by a data processing system, data identifying a physical characteristic of a part of a plurality of parts of a product to assemble;
identifying, by the data processing system, a first constraint corresponding to ergonomic data for assembling the part;
identifying, by the data processing system, a second constraint corresponding to the physical characteristic of the part;
generating, by the data processing system, using the data as an input into a model of the data processing system and based on the first constraint and the second constraint, a sequence identifying an order in which to assemble the part into the product with respect to assembly of the plurality of parts; and
selecting, by the data processing system, using the model and based on physical characteristics of one or more assembly stations, a first assembly station of the one or more assembly stations for installing the part according to the physical characteristics of the first assembly station.

10. The method of claim 9, comprising:
determining, by the data processing system, the order in which the part is to be assembled based on physical characteristics of the plurality of parts.

11. The method of claim 9, comprising:
receiving, by the data processing system, second data to identify an amount of time it takes to assemble each part of the plurality of parts; and
generating, by the data processing system, based on the second data being input into the model, a cycle time to complete the assembly of the product.

12. The method of claim 9, comprising:
generating, by the data processing system, instructions to install the part into the product based on the sequence.

13. The method of claim 9, comprising:
generating, by the data processing system, according to the model, a second sequence for assembly of the plurality of parts, the second sequence to select the first assembly station based on a placement of the part within the product.

14. The method of claim 9, wherein the first assembly station for installing the part is selected based on the ergonomic data.

15. The method of claim 9, wherein the first assembly station for installing the part is selected based on a carrier of the first assembly station.

16. The method of claim 9, comprising:
providing, by the data processing system, in response to a request from a client device, the sequence to the client device.

17. The method of claim 9, comprising:
providing, by the data processing system, in response to a request from a virtual assistant on a client device, information on the first assembly station in which the product is assembled.

18. A non-transitory computer-readable media having processor readable instructions, such that, when executed, causes a processor to:
receive data identifying a physical characteristic of a part of a plurality of parts of a product to assemble;
identify a first constraint corresponding to ergonomic data for assembling the part;
identify a second constraint corresponding to the physical characteristic of the part;
generate, using the data as an input into a model and based on the first constraint and the second constraint, a sequence identifying an order in which to assemble the part into the product with respect to assembly of the plurality of parts; and
select, using the model and based on physical characteristics of one or more assembly stations, a first assembly station of the one or more assembly stations for installing the part according to the physical characteristics of the first assembly station.

* * * * *